(12) United States Patent
Zhai

(10) Patent No.: US 10,068,105 B2
(45) Date of Patent: Sep. 4, 2018

(54) USER AUTHENTICATION METHOD AND TERMINAL

(71) Applicant: Huawei Technologies Co., Ltd., Shenzhen (CN)

(72) Inventor: Zhengde Zhai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 15/136,522

(22) Filed: Apr. 22, 2016

(65) Prior Publication Data

US 2016/0239676 A1 Aug. 18, 2016

Related U.S. Application Data

(63) Continuation of application No. PCT/CN2014/074124, filed on Mar. 26, 2014.

(30) Foreign Application Priority Data

Oct. 25, 2013 (CN) .......................... 2013 1 0511669

(51) Int. Cl.
*H04L 29/06* (2006.01)
*G06F 21/62* (2013.01)
(Continued)

(52) U.S. Cl.
CPC .......... *G06F 21/6218* (2013.01); *G06F 21/36* (2013.01); *H04L 9/3234* (2013.01);
(Continued)

(58) Field of Classification Search
CPC ................. G06F 21/6218; G06F 21/36; G06F 2221/032; H04L 63/0876; H04L 9/3234; H04L 63/08; H04L 9/3271
See application file for complete search history.

(56) References Cited

U.S. PATENT DOCUMENTS

| 2002/0073343 A1 | 6/2002 | Ziskind et al. |
| 2003/0065952 A1 | 4/2003 | Otsuka |

(Continued)

FOREIGN PATENT DOCUMENTS

| CN | 102317949 A | 1/2012 |
| CN | 102487415 A | 6/2012 |

(Continued)

*Primary Examiner* — Morshed Mehedi
(74) *Attorney, Agent, or Firm* — Slater Matsil, LLP

(57) ABSTRACT

A user authentication method and terminal, where the method includes acquiring an authentication interaction object and an interference interaction object where the authentication interaction object is a real interaction object stored in a terminal, the interference interaction object is a virtual interaction object constructed by the terminal, and the interference interaction object has a similar feature with the authentication interaction object to cause interference to a user when the user is selecting the authentication interaction object, displaying the authentication interaction object and the interference interaction object in an authentication interface for the user to select from, receiving a selection result and determining whether the selection result is the authentication interaction object, and determining, when the selection result is the authentication interaction object, that authentication succeeds.

16 Claims, 8 Drawing Sheets

(51) Int. Cl.
 *H04L 9/32* (2006.01)
 *G06F 21/36* (2013.01)
(52) U.S. Cl.
 CPC ......... *H04L 63/08* (2013.01); *H04L 63/0876* (2013.01); *G06F 2221/032* (2013.01); *H04L 9/3271* (2013.01)

(56) References Cited

U.S. PATENT DOCUMENTS

| | | | |
|---|---|---|---|
| 2005/0060554 A1* | 3/2005 | O'Donoghue | G06F 21/36 713/183 |
| 2007/0162739 A1 | 7/2007 | LaCous | |
| 2007/0277224 A1 | 11/2007 | Osborn et al. | |
| 2009/0328162 A1 | 12/2009 | Kokumai et al. | |
| 2010/0180336 A1 | 7/2010 | Jones et al. | |
| 2010/0248689 A1 | 9/2010 | Teng et al. | |
| 2011/0321125 A1* | 12/2011 | Kyohgoku | G06F 21/00 726/2 |
| 2012/0054014 A1* | 3/2012 | Cho | G06Q 30/0225 705/14.26 |
| 2013/0036461 A1 | 2/2013 | Lowry | |
| 2013/0167225 A1* | 6/2013 | Sanft | G06F 21/36 726/19 |
| 2015/0002884 A1* | 1/2015 | Okumura | G06F 3/1203 358/1.14 |
| 2015/0222618 A1* | 8/2015 | Pastor | H04L 63/10 726/4 |
| 2016/0189135 A1* | 6/2016 | Hird | G06Q 20/3224 705/21 |

FOREIGN PATENT DOCUMENTS

| | | |
|---|---|---|
| CN | 102520857 A | 6/2012 |
| CN | 1455899 A | 11/2013 |
| EP | 2565765 A1 | 3/2013 |
| JP | 2002189967 A | 7/2002 |
| JP | 2008226036 A | 9/2008 |
| JP | 2008257701 A | 10/2008 |
| JP | 2009230198 A | 10/2009 |
| JP | 2011220000 A | 11/2011 |
| JP | 2011227573 A | 11/2011 |
| JP | 500942 B2 | 8/2012 |
| JP | 5009422 B2 | 8/2012 |
| RU | 2320009 C2 | 3/2008 |
| WO | 2010113327 A1 | 10/2010 |

* cited by examiner

USER AUTHENTICATION METHOD AND TERMINAL

This application is a continuation of International Application No. PCT/CN2014/074124, filed on Mar. 26, 2014, which claims priority to Chinese Patent Application No. 201310511669.2, filed with the Chinese Patent Office on Oct. 25, 2013, both of which are hereby incorporated by reference in their entireties.

TECHNICAL FIELD

The present invention relates to the field of terminal technologies, and specifically, to a user authentication method and terminal.

BACKGROUND

With wide popularization of terminals, generally, many users require to perform authentication on a user before the user interacts with a terminal, so as to protect information in a personal terminal.

Currently, there are many user authentication methods in a terminal, and a common user authentication method is specifically: a user sets a photo for each contact in a terminal; during user authentication of the terminal, a photo stored in the terminal and names of multiple contacts stored in the terminal are randomly presented on a screen; the user selects a contact according to the photo, and the authentication succeeds if a correct contact is selected.

It may be learned from the foregoing solution that, in this authentication solution, when a photo is displayed, it is prone to display a photo of a person who is well known by people around a terminal user, and the photo can be easily recognized by people, leading to relatively low security of a terminal.

SUMMARY

Embodiments of the present invention provide a user authentication method and apparatus, which can improve security of a terminal.

A first aspect of the embodiments of the present invention discloses a user authentication method, wherein the method includes:

acquiring an authentication interaction object and an interference interaction object after an authentication request is received, where the authentication interaction object is a real interaction object stored in a terminal, the interference interaction object is a virtual interaction object constructed by the terminal, and the interference interaction object has a similar feature with the authentication interaction object, so as to cause interference to a user when the user is selecting the authentication interaction object; displaying the authentication interaction object and the interference interaction object in an authentication interface for the user to select from; receiving a selection result and determining whether the selection result is the authentication interaction object; and determining, when the selection result is the authentication interaction object, that authentication succeeds.

With reference to the first aspect, in a first implementation manner, before the displaying the authentication interaction object and the interference interaction object in an authentication interface for selection, the method further includes:

selecting an obfuscating interaction object from a stored obfuscating interaction object set, where an obfuscating interaction object in the obfuscating interaction object set is a real interaction object designated by the user, and the obfuscating interaction object and the authentication interaction object have no intersection set; and the displaying the authentication interaction object and the interference interaction object in an authentication interface for selection includes:

displaying the authentication interaction object, the interference interaction object, and the obfuscating interaction object in the authentication interface for the user to select from.

With reference to the first implementation manner of the first aspect, in a second implementation manner of the first aspect, before the acquiring an authentication interaction object and an interference interaction object, the method further includes:

reading an authentication difficulty degree, where the authentication difficulty degree includes a first quantity of authentication interaction objects that need to be selected, a second quantity of interference interaction objects that need to be selected, and a third quantity of obfuscating interaction objects that need to be selected;

the acquiring an authentication interaction object and an interference interaction object includes:

acquiring authentication interaction objects of the first quantity and interference interaction objects of the second quantity according to the authentication difficulty degree;

the selecting an obfuscating interaction object from a stored obfuscating interaction object set includes:

acquiring obfuscating interaction objects of the third quantity according to the authentication difficulty degree;

the displaying the authentication interaction object, the interference interaction object, and the obfuscating interaction object in the authentication interface for the user to select from includes:

displaying the authentication interaction objects of the first quantity, the interference interaction objects of the second quantity, and the obfuscating interaction objects of the third quantity in the authentication interface for the user to select from;

the determining whether the selection result is the authentication interaction object includes:

determining whether the selection result is the authentication interaction objects of the first quantity; and the determining, when the selection result is the authentication interaction object, that authentication succeeds is specifically:

determining that the authentication succeeds, when the selection result is the authentication interaction objects of the first quantity.

With reference to the first aspect, in a third implementation manner of the first aspect, before the acquiring an authentication interaction object and an interference interaction object, the method further includes:

reading an authentication difficulty degree, where the authentication difficulty degree includes a first quantity of authentication interaction objects that need to be selected and a second quantity of interference interaction objects that need to be selected;

the acquiring an authentication interaction object and an interference interaction object includes:

acquiring authentication interaction objects of the first quantity and interference interaction objects of the second quantity according to the authentication difficulty degree;

the displaying the authentication interaction object and the interference interaction object in an authentication interface for selection includes:

displaying the authentication interaction objects of the first quantity and the interference interaction objects of the second quantity in the authentication interface for selection;

the determining whether the selection result is the authentication interaction object includes:

determining whether the selection result is the authentication interaction objects of the first quantity; and the determining, when the selection result is the authentication interaction object, that authentication succeeds is specifically:

when the selection result is the authentication interaction objects of the first quantity, determining that the authentication succeeds.

With reference to the first aspect, the first implementation manner of the first aspect, the second implementation manner of the first aspect, or the third implementation manner of the first aspect, in a fourth implementation manner of the first aspect, the acquiring an interference interaction object includes:

constructing the interference interaction object according to the acquired authentication interaction object.

With reference to the first aspect, the first implementation manner of the first aspect, the second implementation manner of the first aspect, the third implementation manner of the first aspect, or the fourth implementation manner of the first aspect, in a fifth implementation manner of the first aspect, the acquiring an interference interaction object includes:

selecting the interference interaction object from a stored interference interaction object set according to the acquired authentication interaction object, where an interference interaction object in the interference interaction object set is pre-constructed by the terminal.

With reference to the first aspect, the first implementation manner of the first aspect, the second implementation manner of the first aspect, the third implementation manner of the first aspect, the fourth implementation manner of the first aspect, or the fifth implementation manner of the first aspect, in a sixth implementation manner of the first aspect, the acquiring an authentication interaction object includes:

selecting the authentication interaction object from a stored authentication interaction object set, where an authentication interaction object in the authentication interaction object set was preset by the user.

A second aspect of the embodiments of the present invention discloses a terminal, where the terminal includes:

a receiving unit, configured to receive an authentication request; an acquiring unit, configured to acquire an authentication interaction object and an interference interaction object when the receiving unit receives the authentication request, where the authentication interaction object is a real interaction object stored in the terminal, the interference interaction object is a virtual interaction object constructed by the terminal, and the interference interaction object has a similar feature with the authentication interaction object, so as to cause interference to a user when the user is selecting the authentication interaction object; a display unit, configured to display the authentication interaction object and the interference interaction object in an authentication interface for the user to select from, where the authentication interaction object and the interference interaction object are acquired by the acquiring unit; where the receiving unit is further configured to receive a selection result; a judging unit, configured to determine, according to the selection result received by the receiving unit, whether the selection result is the authentication interaction object acquired by the acquiring unit; and a determining unit, configured to: when the judging unit determines that the selection result is the authentication interaction object, determine that authentication succeeds.

With reference to the second aspect, in a first implementation manner of the second aspect, the acquiring unit is further configured to:

select an obfuscating interaction object from a stored obfuscating interaction object set, where an obfuscating interaction object in the obfuscating interaction object set is a real interaction object designated by the user, and the obfuscating interaction object and the authentication interaction object have no intersection set; and the display unit is specifically configured to:

display the authentication interaction object, the interference interaction object, and the obfuscating interaction object in the authentication interface for the user to select from, where the authentication interaction object, the interference interaction object, and the obfuscating interaction object are acquired by the acquiring unit.

With reference to the first implementation manner of the second aspect, in a second implementation manner of the second aspect, the terminal further includes a first reading unit, configured to read an authentication difficulty degree, where the authentication difficulty degree includes a first quantity of authentication interaction objects that need to be selected, a second quantity of interference interaction objects that need to be selected, and a third quantity of obfuscating interaction objects that need to be selected;

the acquiring unit is specifically configured to acquire authentication interaction objects of the first quantity, interference interaction objects of the second quantity, and obfuscating interaction objects of the third quantity according to the authentication difficulty degree that is read by the first reading unit;

the display unit is specifically configured to:

display the authentication interaction objects of the first quantity, the interference interaction objects of the second quantity, and the obfuscating interaction objects of the third quantity in the authentication interface for selection;

the judging unit is specifically configured to:

determine whether the selection result is the authentication interaction objects of the first quantity; and the determining unit is specifically configured to:

determine that the authentication succeeds, when the judging unit determines that the selection result is the authentication interaction objects of the first quantity.

With reference to the second aspect, in a third implementation manner of the second aspect, the terminal further includes a second reading unit, where:

the second reading unit is specifically configured to read an authentication difficulty degree, where the authentication difficulty degree includes a first quantity of authentication interaction objects that need to be selected and a second quantity of interference interaction objects that need to be selected;

the acquiring unit is specifically configured to:

acquire authentication interaction objects of the first quantity and interference interaction objects of the second quantity according to the authentication difficulty degree that is read by the second reading unit;

the display unit is specifically configured to:

display the authentication interaction objects of the first quantity and the interference interaction objects of the second quantity in the authentication interface for selection;

the judging unit is specifically configured to:

determine whether the selection result is the authentication interaction objects of the first quantity; and the determining unit is specifically configured to:

when the judging unit determines that the selection result is the authentication interaction objects of the first quantity, determine that the authentication succeeds.

With reference to the second aspect, the first implementation manner of the second aspect, the second implementation manner of the second aspect, or the third implementation manner of the second aspect, in a fourth implementation manner of the second aspect, the acquiring unit is configured to:

construct the interference interaction object according to the authentication interaction object.

With reference to the second aspect, the first implementation manner of the second aspect, the second implementation manner of the second aspect, the third implementation manner of the second aspect, or the fourth implementation manner of the second aspect, in a fifth implementation manner of the second aspect, the acquiring unit is specifically configured to:

select the interference interaction object from a stored interference interaction object set according to the authentication interaction object, where an interference interaction object in the interference interaction object set is preconstructed by the terminal.

With reference to the second aspect, the first implementation manner of the second aspect, the second implementation manner of the second aspect, the third implementation manner of the second aspect, the fourth implementation manner of the second aspect, or the fifth implementation manner of the second aspect, in a sixth implementation manner of the second aspect, the acquiring unit is specifically configured to:

select the authentication interaction object from a stored authentication interaction object set, where an authentication interaction object in the authentication interaction object set was preset by the user.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is made up by the terminal, and has a similar feature with the authentication interaction object, so that an anti-attack capability of the terminal can be improved during the user authentication; further, an obfuscating interaction object is a real interaction object designated by the user in the terminal, and during the user authentication, the obfuscating interaction object can improve the anti-attack capability of the terminal because an owner of the terminal can distinguish between the authentication interaction object and the obfuscating interaction object; further, an authentication difficulty degree includes a first quantity of authentication interaction objects, a second quantity of interference interaction objects, and a third quantity of obfuscating interaction objects, and during the user authentication, if the user does not know a quantity of authentication interaction objects that need to be selected, it is very difficult to succeed in the user authentication, and the authentication difficulty degree improves the anti-attack capability of the terminal; and further, the authentication interaction object, the interference interaction object, and the obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
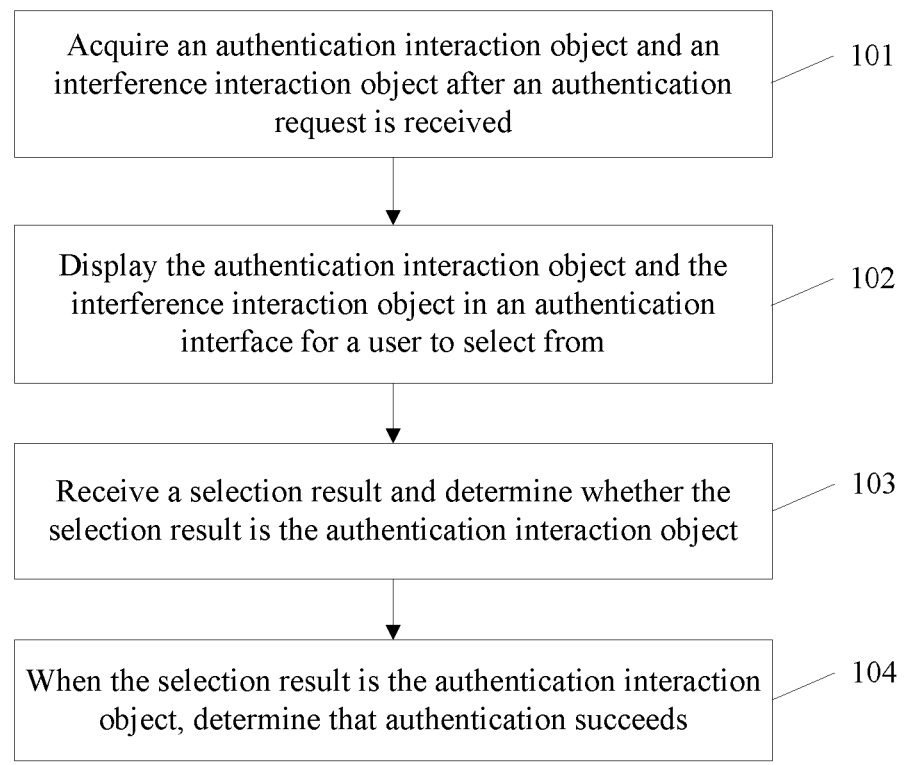
FIG. 1 is a flowchart of a user authentication method according to an embodiment of the present invention.

To make the objectives, technical solutions, and advantages of the embodiments of the present invention clearer, the following clearly describes the embodiments of the disclosure with reference to the accompanying drawings. Apparently, the described embodiments are some but not all of the embodiments of the present disclosure. All other embodiments obtained by a person of ordinary skill in the art based on the disclosed embodiments without creative efforts shall fall within the protection scope of the present invention.

The following describes a user authentication method in an embodiment of the present invention according to FIG. 1. A process in which a terminal performs authentication on a user is described in the method, where the terminal may be a device such as a smartphone, a computer, or a game console. The method specifically includes the following steps:

101. Acquire an authentication interaction object and an interference interaction object after an authentication request is received, where the authentication interaction object is a real interaction object stored in a terminal, the interference interaction object is a virtual interaction object constructed by the terminal, and the interference interaction object has a similar feature with the authentication interaction object, so as to cause interference to a user when the user is selecting the authentication interaction object.

The authentication interaction object is acquired after the authentication request is received. The authentication interaction object is a real interaction object stored in the terminal. Many resources in the terminal may be interaction objects, for example, a name of a contact, a name of an application program, a name of music, a name of a book, and a picture. The authentication interaction object may be an interaction object that is stored in the terminal and that is preset by the user. If the user sets a sensitive interaction object, the authentication interaction object may be any one or more interaction objects that are stored in the terminal except the sensitive interaction object, where the sensitive interaction object refers to personal privacy of the user; or if the user does not set a sensitive interaction object, the authentication interaction object may be any one or more interaction objects that are stored in the terminal. The authentication interaction object is a real interaction object stored in the terminal. When the user configures the user authentication, if the user considers that no appropriate interaction object in the terminal can be used as the authentication interaction object, the user may enter an interaction object and use the interaction object as the authentication interaction object. The authentication interaction object is a real interaction object stored in the terminal. During user authentication, a memory burden on the user can be reduced because the user is familiar with an interaction object stored in the terminal of the user; because the authentication interaction object is selected from a wide range, various types of interaction objects can be provided during the user authentication, bringing more fun to an authentication process and improving user experience.

The interference interaction object is acquired after the authentication request is received. The interference interaction object is a virtual interaction object constructed by the terminal, and has a similar feature with the authentication interaction object, so as to cause interference to the user when the user is selecting the authentication interaction object. The interference interaction object may be acquired from a stored interference interaction object set according to the acquired authentication interaction object, where an interference interaction object in the interference interaction object set is pre-constructed by the terminal; or the interference interaction object may be directly constructed by the terminal according to the acquired authentication interaction object, where the interference interaction object is not a real interaction object stored in the terminal.

A similar feature refers to a similar appearance feature or a similar structural feature, so that a viewer cannot easily distinguish between the authentication interaction object and the interference interaction object from a distance, and needs to perform careful observation to make correct distinction. For example, if the authentication interaction object that is set by the user is a name of a contact kerry, a name such as kelly may appear when the terminal constructs the interference interaction object according to an appearance feature of the authentication interaction object. For example, if the authentication interaction object that is set by the user is a picture, the terminal analyzes color proportions and color distributions in the picture, constructs multiple pictures having similar color proportions and color distributions, and uses the multiple pictures as interference interaction objects. Because the interference interaction object has a similar feature with the authentication interaction object, the interference interaction object is relatively confusing, so that an anti-attack capability and an anti-peeping capability of the terminal can be improved.

The authentication interaction object and the interference interaction object are acquired after the authentication request is received. The authentication interaction object obtained this time is compared with an authentication interaction object acquired in a previous time or authentication interaction objects acquired in previous several times, and if the authentication interaction object acquired this time is completely the same as the authentication interaction object acquired in the previous time or the authentication interaction objects acquired in the previous several times, acquiring is performed again. The acquired interference interaction object may also be compared with an interference interaction object acquired in a previous time or interference interaction objects acquired in previous several times, and if the acquired interference interaction object is completely the same as the interference interaction object acquired in the previous time or the interference interaction objects acquired in the previous several times, acquiring is performed again.

Authentication interaction objects may be of a same type, and a type of the interference interaction object may be consistent with a type of the authentication interaction object. In an embodiment of the present invention, if the type of the authentication interaction object is a name of a contact, the interference interaction object set also stores a name of a contact.

Alternatively, the authentication interaction objects may be of different types. For example, there is not only an interaction object of a type of a name of a contact, but also an interaction object of another type such as a picture, a name of music, or a name of an ebook. In another embodiment of the present invention, if the types of the authentication interaction objects include a name of a contact and a picture, interference interaction objects also include a name of a contact and a picture.

102. Display the authentication interaction object and the interference interaction object in an authentication interface for the user to select from.

The acquired authentication interaction object and the acquired interference interaction object are displayed in the authentication interface for the user to select from. The authentication interaction object and the interference interaction object may be displayed in the authentication interface in a sequence as they are acquired, or the acquired authentication interaction object and the acquired interference interaction object may be randomly displayed in the authentication interface. There are multiple display sequences, which are not listed one by one.

103. Receive a selection result and determine whether the selection result is the authentication interaction object.

The selection result of the user is received, and whether the selection result is the authentication interaction object is determined. It may be determined whether a quantity of selected interaction objects is correct; if the quantity is correct, it is further determined whether a selected interaction object is the authentication interaction object displayed in the authentication interface; or if the quantity is incorrect, the user is notified that authentication fails, and the user may choose to continue to go for a next round of authentication or to give up authentication. The quantity of interaction objects selected by the user is directly compared with a quantity of authentication interaction objects displayed in the authentication interface, which can increase a running speed of the terminal and improve user experience.

To determine whether the selection result is the authentication interaction object, it may also be directly determined whether an interaction object selected by the user is completely the authentication interaction object displayed in the authentication interface, so as to obtain a determining result at a time.

104. When the selection result is the authentication interaction object, determine that authentication succeeds.

For the selection result, if not only the quantity is equal to the quantity of authentication interaction objects displayed in the authentication interface, but also all selected interaction objects are authentication interaction objects displayed in the authentication interface, the authentication succeeds, and the user is allowed to perform a further operation, for example, to use the terminal or use an application program.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and during the user authentication, an anti-attack capability of the terminal can be improved because the interference interaction object has a similar feature with the authentication interaction object; and further, the authentication interaction object and the interference interaction object may be interaction objects such as a name of a contact, a name of an application program, a name of a book, a name of music, and a picture, and extensive interaction object types cover a large quantity of interaction objects; therefore, during a user authentication process, different authentication interaction objects and interference interaction objects may be displayed in an authentication interface at a time, thereby not only improving the anti-attack capability of the terminal, but also bringing more fun to the authentication process.

Figure 2:
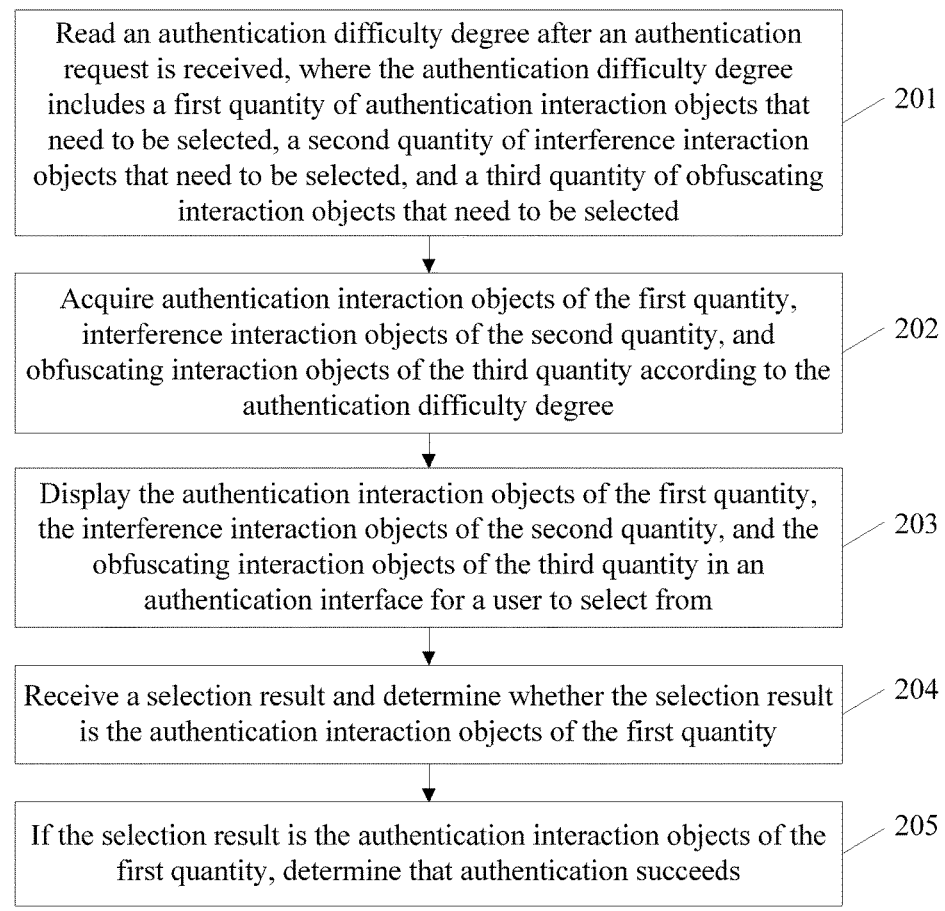
FIG. 2 is a flowchart of a user authentication method according to another embodiment of the present invention.

In FIG. 2, a user authentication method according to another embodiment of the present invention is described.

201. Read an authentication difficulty degree after an authentication request is received, where the authentication difficulty degree includes a first quantity of authentication interaction objects that need to be selected, a second quantity of interference interaction objects that need to be selected, and a third quantity of obfuscating interaction objects that need to be selected, where the authentication interaction object is a real interaction object stored in a terminal; the interference interaction object is a virtual interaction object constructed by the terminal, and has a similar feature with the authentication interaction object, so as to cause interference to a user when the user is selecting the authentication interaction object; and the obfuscating interaction object is a real interaction object designated by the user, and has no intersection with the authentication interaction object.

The authentication difficulty degree is read after the authentication request is received, where the authentication difficulty degree includes the first quantity of authentication interaction objects that need to be selected, and the authentication interaction object is a real interaction object stored in the terminal. Many resources in the terminal may be interaction objects, for example, a name of a contact, a name of an application program, a name of music, a name of a book, and a picture. The authentication interaction object may be an interaction object that is stored in the terminal and that is preset by the user. If the user sets a sensitive interaction object, the authentication interaction object may be any one or more interaction objects that are stored in the terminal except the sensitive interaction object, where the sensitive interaction object refers to personal privacy of the user; or if the user does not set a sensitive interaction object, the authentication interaction object may be any one or more interaction objects that are stored in the terminal.

When the user configures the user authentication, if the user considers that no appropriate interaction object in the terminal can be used as the authentication interaction object, the user may enter an interaction object and use the interaction object as the authentication interaction object. The authentication interaction object is a real interaction object stored in the terminal. During user authentication, a memory burden on the user can be reduced because the user is familiar with an interaction object stored in the terminal of the user; because the authentication interaction object is selected from a wide range, various types of interaction objects can be provided during the user authentication, bringing more fun to an authentication process and improving user experience.

The authentication difficulty degree is read after the authentication request is received, where the authentication difficulty degree includes the second quantity of interference interaction objects that need to be selected, and the interference interaction object is a virtual interaction object constructed by the terminal, and has a similar feature with the authentication interaction object, so as to cause interference to the user when the user is selecting the authentication interaction object. The interference interaction object may be acquired from a stored interference interaction object set according to the acquired authentication interaction object, where an interference interaction object in the interference interaction object set is pre-constructed by the terminal; or the interference interaction object may be directly constructed by the terminal according to the acquired authentication interaction object, where the interference interaction object is not a real interaction object stored in the terminal.

A similar feature refers to a similar appearance feature or a similar structural feature, so that a viewer cannot easily distinguish between the authentication interaction object and the interference interaction object from a distance, and needs to perform careful observation to make correct distinction. For example, if the authentication interaction object that is set by the user is a name of a contact helly, a name such as herry may appear when the terminal constructs the interference interaction object according to an appearance feature of the authentication interaction object. For example, if the authentication interaction object that is set by the user is a picture, the terminal analyzes color proportions and color distributions in the picture, constructs multiple pictures having similar color proportions and color distributions, and uses the multiple pictures as interference interaction objects. Because the interference interaction object has a similar feature with the authentication interaction object, the interference interaction object is relatively confusing, so that an anti-attack capability and an anti-peeping capability of the terminal can be improved.

The authentication difficulty degree is read after the authentication request is received, where the authentication difficulty degree includes the third quantity of obfuscating interaction objects that need to be selected, where the obfuscating interaction object is a real interaction object designated by the user, and has no intersection with the authentication interaction object. The obfuscating interaction object is a real interaction object that is stored in the terminal and that is designated by the user. If the user sets a sensitive interaction object, the obfuscating interaction object is selected from a maximum range of real interaction objects that are stored in the terminal except the authentication interaction object and the sensitive interaction object, where the sensitive interaction object refers to personal privacy of the user; or if the user does not set a sensitive interaction object, the obfuscating interaction object is selected from a range of all real interaction objects that are stored in the terminal except the authentication interaction object. Having no intersection means that an interaction object stored in the terminal belongs to only one set and a case in which an interaction object stored in the terminal belongs to two sets at the same time does not exist, where the set may be an authentication interaction object set, a sensitive interaction object set, or an obfuscating interaction object set. Because the obfuscating interaction object is also a real interaction object stored in the terminal, during the user authentication, the obfuscating interaction object is relatively confusing, so that the anti-attack capability of the terminal can be improved.

Authentication interaction objects may be of a same type, and a type of the interference interaction object and a type of the obfuscating interaction object may be consistent with a type of the authentication interaction object. In an embodiment of the present invention, if the type of the authentication interaction object is a name of a contact, the interference interaction object set also stores a name of a contact, and the obfuscating interaction object set also stores a name of a contact.

Alternatively, the authentication interaction objects may be of different types. For example, there is not only an interaction object of a type of a name of a contact, but also an interaction object of another type such as a picture, a name of music, or a name of an ebook. In another embodiment of the present invention, if the types of the authentication interaction objects include a name of a contact and a picture, the interference interaction object set and the obfuscating interaction object set also include a name of a contact and a picture.

202. Acquire authentication interaction objects of the first quantity, interference interaction objects of the second quantity, and obfuscating interaction objects of the third quantity according to the authentication difficulty degree.

In an embodiment of the present invention, the interference interaction object may be directly acquired from the interference interaction object set, or may be constructed by the terminal, where the interference interaction object has a similar appearance feature with the authentication interaction object, so that the anti-peeping capability and the anti-attack capability can be improved during the user authentication.

In an embodiment of the present invention, the authentication interaction object may be directly acquired from an authentication interaction object set that is set by the user.

During the user authentication, because the authentication interaction object is designated by the user, the memory burden on the user can be reduced if the user selects an authentication interaction object that is set by the user.

In an embodiment of the present invention, the obfuscating interaction object may be acquired from a real interaction object set that is designated by the user. The obfuscating interaction object is a real interaction object stored in the terminal, and the obfuscating interaction object has no intersection with the authentication interaction object. If the user sets a sensitive interaction object, the obfuscating interaction object is selected from a maximum range of real interaction objects that are stored in the terminal except the authentication interaction object and the sensitive interaction object, where the sensitive interaction object refers to personal privacy of the user; or if the user does not set a sensitive interaction object, the obfuscating interaction object is selected from a range of all real interaction objects that are stored in the terminal except the authentication interaction object. Having no intersection means that an interaction object stored in the terminal belongs to only one set and a case in which an interaction object stored in the terminal belongs to two sets at the same time does not exist, where the set may be an authentication interaction object set, a sensitive interaction object set, or an obfuscating interaction object set. Because the obfuscating interaction object is also a real interaction object stored in the terminal, during the user authentication, the obfuscating interaction object is relatively confusing, so that the anti-attack capability of the terminal can be improved.

The authentication interaction objects of the first quantity, the interference interaction objects of the second quantity, and the obfuscating interaction objects of the third quantity are acquired according to the authentication difficulty degree. The authentication interaction object obtained this time is compared with an authentication interaction object acquired in a previous time or authentication interaction objects acquired in previous several times, and if the authentication interaction object acquired this time is completely the same as the authentication interaction object acquired in the previous time or the authentication interaction objects acquired in the previous several times, acquiring is performed again. The acquired interference interaction object may also be compared with an interference interaction object acquired in a previous time or interference interaction objects acquired in previous several times, and if the acquired interference interaction object is completely the same as the interference interaction object acquired in the previous time or the interference interaction objects acquired in the previous several times, acquiring is performed again.

In another embodiment of the present invention, if the authentication difficulty degree is a high-level authentication difficulty degree, the terminal may acquire three interaction objects from each of the authentication interaction object set, the interference interaction object set, and the obfuscating interaction object set; if a quantity of interaction objects in one set is less than three, the authentication difficulty degree automatically drops from the high-level difficulty degree to a medium-level difficulty degree, and two interaction objects are acquired from each set according to the medium-level difficulty degree; if a quantity of interaction objects in one set is less than two, the authentication difficulty degree automatically drops from the medium-level difficulty degree to a low-level difficulty degree, and an interaction object is acquired from each set according to the low-level difficulty degree. According to a requirement of the user, the user sets a suitable authentication difficulty degree for the user, which helps improve user experience.

203. Display the authentication interaction objects of the first quantity, the interference interaction objects of the second quantity, and the obfuscating interaction objects of the third quantity in an authentication interface for the user to select from.

The acquired authentication interaction objects of the first quantity, the acquired interference interaction objects of the second quantity, and the acquired obfuscating interaction objects of the third quantity are displayed in the authentication interface for the user to select from. The authentication interaction object, the interference interaction object, and the obfuscating interaction object may be displayed in the authentication interface in a sequence as they are acquired, or the acquired authentication interaction object, the acquired interference interaction object, and the acquired obfuscating interaction object may be randomly displayed in the authentication interface. There are multiple display sequences, which are not listed one by one.

204. Receive a selection result and determine whether the selection result is the authentication interaction objects of the first quantity.

The selection result of the user is received, and whether the selection result is the authentication interaction object is determined. It may be determined whether a quantity of selected interaction objects is correct; if the quantity is correct, it is further determined whether a selected interaction object is the authentication interaction object displayed in the authentication interface; or if the quantity is incorrect, the user is notified that authentication fails, and the user may choose to go for a next round of authentication or to give up authentication. The quantity of interaction objects selected by the user is directly compared with a quantity of authentication interaction objects displayed in the authentication interface, which can increase a running speed of the terminal and improve user experience.

To determine whether the selection result is the authentication interaction object, it may also be directly determined whether an interaction object selected by the user is completely the authentication interaction object displayed in the authentication interface, so as to obtain a determining result at a time.

205. If the selection result is the authentication interaction objects of the first quantity, determine that authentication succeeds.

For the selection result, if not only the quantity is equal to the quantity of authentication interaction objects displayed in the authentication interface, but also all selected interaction objects are authentication interaction objects displayed in the authentication interface, the authentication succeeds, and the user is allowed to perform a further operation, for example, to use the terminal or use an application program.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; further, an obfuscating interaction object is a real interaction object designated by the user in the terminal, and during the user authentication, the obfuscating interaction object can improve the anti-attack capability of the terminal because an owner of the terminal can distinguish between the authentication interaction object and the obfuscating interaction object; further, an authentication difficulty degree includes a first quantity of authentication interaction objects, a second quantity of interference interaction objects, and a third quantity of obfuscating interaction objects, and during the user authentication, if the user does not know a quantity of authentication interaction objects that need to be selected, it is very difficult to succeed in the user authentication, and the authentication difficulty degree improves the anti-attack capability of the terminal; and the authentication interaction object, the interference interaction object, and the obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

Figure 3:
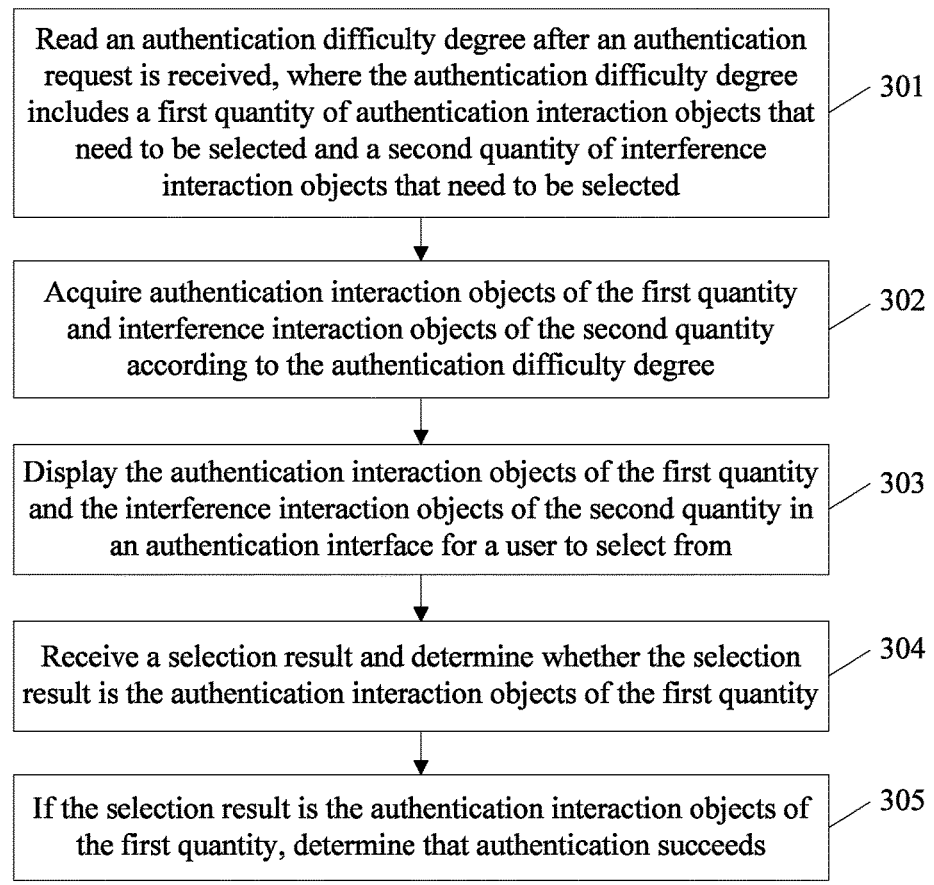
FIG. 3 is a flowchart of a user authentication method according to another embodiment of the present invention.

In FIG. 3, a user authentication method according to another embodiment of the present invention is described.

301. Read an authentication difficulty degree after an authentication request is received, where the authentication difficulty degree includes a first quantity of authentication interaction objects that need to be selected and a second quantity of interference interaction objects that need to be selected, the authentication interaction object is a real interaction object stored in a terminal, the interference interaction object is a virtual interaction object constructed by the terminal, and the interference interaction object has a similar feature with the authentication interaction object, so as to cause interference to a user when the user is selecting the authentication interaction object.

The authentication difficulty degree is read after the authentication request is received, where the authentication difficulty degree includes the first quantity of authentication interaction objects that need to be selected. The authentication interaction object is a real interaction object stored in the terminal. During configuration of a parameter used for user authentication, if the user does not set a sensitive interaction object, the authentication interaction object may be any one or more real interaction objects stored in the terminal, where the sensitive interaction object refers to personal privacy of the user; or if the user sets a sensitive interaction object, the authentication interaction object may be any one or more real interaction objects that are stored in the terminal except the sensitive interaction object.

When the user configures the user authentication, if the user considers that no appropriate interaction object in the terminal can be used as the authentication interaction object, the user may enter an interaction object and use the interaction object as the authentication interaction object. The authentication interaction object is a real interaction object stored in the terminal. During the user authentication, a memory burden on the user can be reduced because the user is familiar with an interaction object stored in the terminal of the user; because the authentication interaction object is selected from a wide range, various types of interaction objects can be provided during the user authentication, bringing more fun to an authentication process and improving user experience.

The authentication difficulty degree is read after the authentication request is received, where the authentication difficulty degree includes the second quantity of interference interaction objects that need to be selected. The interference interaction object is a virtual interaction object constructed by the terminal, and has a similar feature with the authentication interaction object, so as to cause interference to the user when the user is selecting the authentication interaction object. The interference interaction object may be acquired from a stored interference interaction object set according to the acquired authentication interaction object, where an interference interaction object in the interference interaction object set is pre-constructed by the terminal; or the interference interaction object may be directly constructed by the terminal according to the acquired authentication interaction object, where the interference interaction object is not a real interaction object stored in the terminal.

A similar feature refers to a similar appearance feature or a similar structural feature, so that a viewer cannot easily distinguish between the authentication interaction object and the interference interaction object from a distance, and needs to perform careful observation to make correct distinction. For example, if the authentication interaction object that is set by the user is a name of a contact kerry, a name such as kelly may appear when the terminal constructs the interference interaction object according to an appearance feature of the authentication interaction object. For example, if the authentication interaction object that is set by the user is a picture, the terminal analyzes color proportions and color distributions in the picture, constructs multiple pictures having similar color proportions and color distributions, and uses the multiple pictures as interference interaction objects. Because the interference interaction object has a similar feature with the authentication interaction object, the interference interaction object is relatively confusing, so that an anti-attack capability and an anti-peeping capability of the terminal can be improved.

Authentication interaction objects may be of a same type, and a type of the interference interaction object and a type of the obfuscating interaction object may be consistent with a type of the authentication interaction object. In an embodiment of the present invention, if the type of the authentication interaction object is a name of a contact, the interference interaction object set also stores a name of a contact, and an obfuscating interaction object set also stores a name of a contact.

Alternatively, the authentication interaction objects may be of different types. For example, there is not only an interaction object of a type of a name of a contact, but also an interaction object of another type such as a picture, a name of music, or a name of an ebook. In another embodiment of the present invention, if the types of the authentication interaction objects include a name of a contact and a picture, the interference interaction object set and the obfuscating interaction object set also include a name of a contact and a picture.

302. Acquire authentication interaction objects of the first quantity and interference interaction objects of the second quantity according to the authentication difficulty degree.

In an embodiment of the present invention, the interference interaction object may be directly acquired from the interference interaction object set, or may be constructed by the terminal when the interference interaction object is acquired. The interference interaction object has a similar feature with the authentication interaction object, where the similar feature may be a similar appearance feature and can improve the anti-attack capability.

In an embodiment of the present invention, the authentication interaction object is acquired, and during the configuration of the parameter used for user authentication, if a sensitive interaction object is set, the authentication interaction object may be any one or more real interaction objects that are stored in the terminal except the sensitive interaction object; or if no sensitive interaction object is set, the authentication interaction object may be any one or more real interaction objects that are stored in the terminal.

The authentication interaction objects of the first quantity and the interference interaction objects of the second quantity are acquired according to the authentication difficulty degree. The authentication interaction object obtained this time is compared with an authentication interaction object acquired in a previous time or authentication interaction objects acquired in previous several times, and if the authentication interaction object acquired this time is completely the same as the authentication interaction object acquired in the previous time or the authentication interaction objects acquired in the previous several times, acquiring is performed again. The acquired interference interaction object may also be compared with an interference interaction object acquired in a previous time or interference interaction objects acquired in previous several times, and if the acquired interference interaction object is completely the same as the interference interaction object acquired in the previous time or the interference interaction objects acquired in the previous several times, acquiring is performed again.

In another embodiment of the present invention, if the authentication difficulty degree is a high-level authentication difficulty degree, the terminal may acquire three interaction objects from each of an authentication interaction object set and the interference interaction object set; if a quantity of interaction objects in one set is less than three, the authentication difficulty degree automatically drops from the high-level authentication difficulty degree to a medium-level difficulty degree, and two interaction objects are acquired from each set according to the medium-level difficulty degree; if a quantity of interaction objects in one set is less than two, the authentication difficulty degree automatically drops from the medium-level difficulty degree to a low-level difficulty degree, and an interaction object is acquired from each set according to the low-level difficulty degree. According to a requirement of the user, the user sets a suitable authentication difficulty degree for the user, which helps improve user experience.

303. Display the authentication interaction objects of the first quantity and the interference interaction objects of the second quantity in an authentication interface for the user to select from.

The acquired authentication interaction objects of the first quantity and the acquired interference interaction objects of the second quantity are displayed in the authentication interface for the user to select from. The authentication interaction object and the interference interaction object may be displayed in the authentication interface in a sequence as they are acquired, or the acquired authentication interaction object and the acquired interference interaction object may be randomly displayed in the authentication interface, instead of being displayed in a sequence as they are acquired. There are multiple display sequences, which are not listed one by one.

304. Receive a selection result and determine whether the selection result is the authentication interaction objects of the first quantity.

The selection result of the user is received, and whether the selection result is the authentication interaction object is determined. It may be determined whether a quantity of selected interaction objects is correct; if the quantity is correct, it is further determined whether a selected interaction object is the authentication interaction object displayed in the authentication interface; or if the quantity is incorrect, the user is notified that authentication fails, and the user may choose to go for a next round of authentication or to give up authentication. The quantity of interaction objects selected by the user is directly compared with a quantity of authentication interaction objects displayed in the authentication interface, which can increase a running speed of the terminal and improve user experience.

To determine whether the selection result is the authentication interaction object, it may also be directly determined whether an interaction object selected by the user is completely the authentication interaction object displayed in the authentication interface, so as to obtain a determining result at a time.

305. If the selection result is the authentication interaction objects of the first quantity, determine that authentication succeeds.

For the selection result, if not only the quantity is equal to the quantity of authentication interaction objects displayed in the authentication interface, but also all selected interaction objects are authentication interaction objects displayed in the authentication interface, the authentication succeeds, and the user is allowed to perform a further operation, for example, to use the terminal or use an application program.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and during the user authentication, an anti-attack capability of the terminal can be improved because the interference interaction object has a similar feature with the authentication interaction object; an authentication difficulty degree includes a first quantity of authentication interaction objects and a second quantity of interference interaction objects, and during the user authentication, if the user does not know a quantity of authentication interaction objects that need to be selected, it is very difficult to succeed in the user authentication, and the authentication difficulty degree improves the anti-attack capability of the terminal; and the authentication interaction object and the interference interaction object may be interaction objects such as a name of a contact, a name of an application program, a name of a book, a name of music, and a picture, and extensive interaction object types cover a large quantity of interaction objects; therefore, during a user authentication process, different authentication interaction objects and interference interaction objects may be displayed in an authentication interface at a time, thereby not only improving the anti-attack capability of the terminal, but also bringing more fun to the authentication process.

Figure 4:
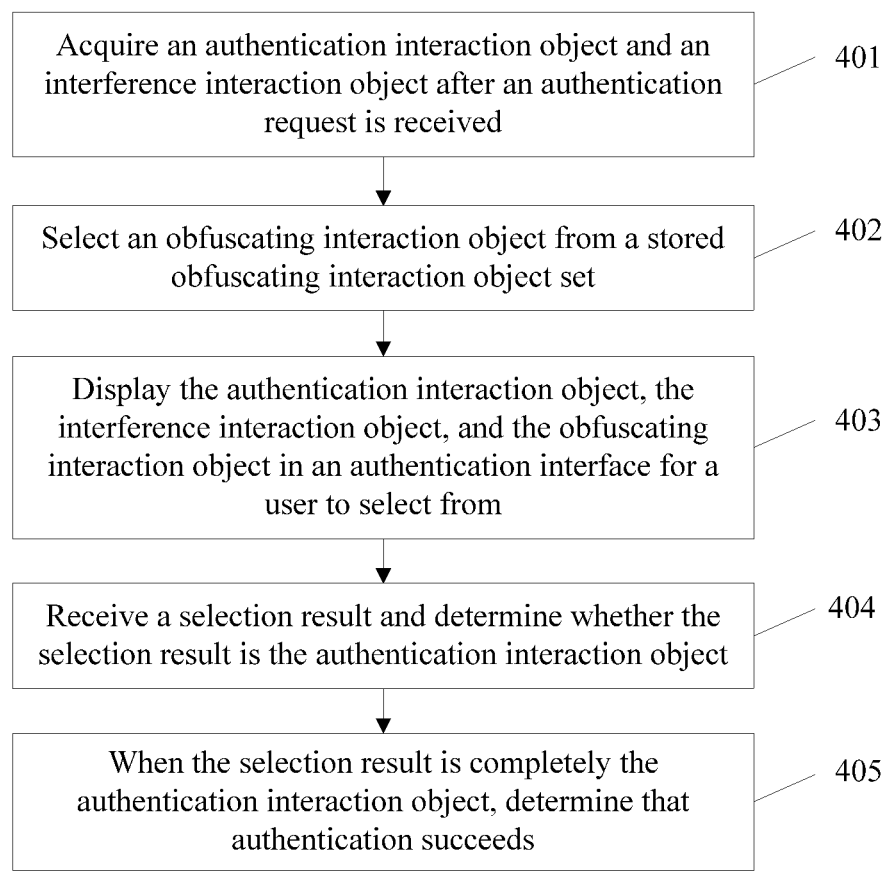
FIG. 4 is a flowchart of a user authentication method according to another embodiment of the present invention.

In FIG. 4, a user authentication method according to another embodiment of the present invention is described.

401. Acquire an authentication interaction object and an interference interaction object after an authentication request is received, where the authentication interaction object is a real interaction object stored in a terminal, the interference interaction object is a virtual interaction object constructed by the terminal, and the interference interaction object has a similar feature with the authentication interaction object, so as to cause interference to a user when the user is selecting the authentication interaction object.

The authentication interaction object is acquired after the authentication request is received. The authentication interaction object is a real interaction object stored in the terminal. Many resources in the terminal may be interaction objects, for example, a name of a contact, a name of an application program, a name of music, a name of a book, and a picture. The authentication interaction object may be an interaction object that is stored in the terminal and that is preset by the user. If the user sets a sensitive interaction object, the authentication interaction object may be any one or more interaction objects that are stored in the terminal except the sensitive interaction object, where the sensitive interaction object refers to personal privacy of the user; or if the user does not set a sensitive interaction object, the authentication interaction object may be any one or more interaction objects that are stored in the terminal. The authentication interaction object is a real interaction object stored in the terminal. When the user configures the user authentication, if the user considers that no appropriate interaction object in the terminal can be used as the authentication interaction object, the user may enter an interaction object and use the interaction object as the authentication interaction object. The authentication interaction object is a real interaction object stored in the terminal. During user authentication, a memory burden on the user can be reduced because the user is familiar with an interaction object stored in the terminal of the user; because the authentication interaction object is selected from a wide range, various types of interaction objects can be provided during the user authentication, bringing more fun to an authentication process and improving user experience.

The interference interaction object is acquired after the authentication request is received. The interference interaction object is a virtual interaction object constructed by the terminal, and has a similar feature with the authentication interaction object, so as to cause interference to the user when the user is selecting the authentication interaction object. The interference interaction object may be acquired from a stored interference interaction object set according to the acquired authentication interaction object, where an interference interaction object in the interference interaction object set is pre-constructed by the terminal; or the interference interaction object may be directly constructed by the terminal according to the acquired authentication interaction object, where the interference interaction object is not a real interaction object stored in the terminal.

A similar feature may refer to a similar appearance feature. For example, if the authentication interaction object that is set by the user is a name of a contact kerry, a name such as kelly may appear when the terminal constructs the interference interaction object according to an appearance feature of the authentication interaction object. For example, if the authentication interaction object that is set by the user is a picture, the terminal analyzes color proportions and color distributions in the picture, constructs multiple pictures having similar color proportions and color distributions, and uses the multiple pictures as interference interaction objects. Because the interference interaction object has a similar feature with the authentication interaction object, the interference interaction object is relatively confusing, so that an anti-attack capability and an anti-peeping capability of the terminal can be improved.

The authentication interaction object and the interference interaction object are acquired after the authentication request is received. The authentication interaction object obtained this time is compared with an authentication interaction object acquired in a previous time or authentication interaction objects acquired in previous several times, and if the authentication interaction object acquired this time is completely the same as the authentication interaction object acquired in the previous time or the authentication interaction objects acquired in the previous several times, acquiring is performed again. The acquired interference interaction object may also be compared with an interference interaction object acquired in a previous time or interference interaction objects acquired in previous several times, and if the acquired interference interaction object is completely the same as the interference interaction object acquired in the previous time or the interference interaction objects acquired in the previous several times, acquiring is performed again.

Authentication interaction objects may be of a same type, and a type of the interference interaction object may be consistent with a type of the authentication interaction object. In an embodiment of the present invention, if the type of the authentication interaction object is a name of a contact, the interference interaction object set also stores a name of a contact.

Alternatively, the authentication interaction objects may be of different types. For example, there is not only an interaction object of a type of a name of a contact, but also an interaction object of another type such as a picture, a name of music, or a name of an ebook. In another embodiment of the present invention, if the types of the authentication interaction objects include a name of a contact and a picture, interference interaction objects also include a name of a contact and a picture.

402. Select an obfuscating interaction object from a stored obfuscating interaction object set, where an obfuscating interaction object in the obfuscating interaction object set is a real interaction object designated by the user, and the obfuscating interaction object has no intersection with the authentication interaction object.

The obfuscating interaction object is a real interaction object that is stored in the terminal and that is designated by the user. If the user sets a sensitive interaction object, the obfuscating interaction object is selected from a maximum range of real interaction objects that are stored in the terminal except the authentication interaction object and the sensitive interaction object, where the sensitive interaction object refers to personal privacy of the user; or if the user does not set a sensitive interaction object, the obfuscating interaction object is selected from a range of all real interaction objects that are stored in the terminal except the authentication interaction object. Having no intersection means that an interaction object stored in the terminal belongs to only one set and a case in which an interaction object stored in the terminal belongs to two sets at the same time does not exist, where the set may be an authentication interaction object set, a sensitive interaction object set, or an obfuscating interaction object set. Because the obfuscating interaction object is also a real interaction object stored in the terminal, during the user authentication, the obfuscating interaction object is relatively confusing, so that the anti-attack capability of the terminal can be improved.

403. Display the authentication interaction object, the interference interaction object, and the obfuscating interaction object in an authentication interface for the user to select from.

The acquired authentication interaction object, the acquired interference interaction object, and the acquired obfuscating interaction object are displayed in the authentication interface. The authentication interaction object, the interference interaction object, and the obfuscating interaction object may be displayed in the authentication interface in a sequence as they are acquired, or the acquired authentication interaction object, the acquired interference interaction object, and the acquired obfuscating interaction object may be randomly displayed in the authentication interface, instead of being displayed in a sequence as they are acquired. There are multiple display sequences, which are not listed one by one.

404. Receive a selection result and determine whether the selection result is the authentication interaction object.

The selection result of the user is received, and whether the selection result is the authentication interaction object is determined. It may be determined whether a quantity of selected interaction objects is correct; if the quantity is correct, it is further determined whether a selected interaction object is the authentication interaction object displayed in the authentication interface; or if the quantity is incorrect, the user is notified that authentication fails, and the user may choose to continue to go for a next round of authentication or to give up authentication. The quantity of interaction objects selected by the user is directly compared with a quantity of authentication interaction objects displayed in the authentication interface, which can increase a running speed of the terminal and improve user experience.

To determine whether the selection result is the authentication interaction object, it may also be directly determined whether an interaction object selected by the user is completely the authentication interaction object displayed in the authentication interface, so as to obtain a determining result at a time.

405. When a selected interaction object is the authentication interaction object, determine that authentication succeeds.

For the selection result, if not only the quantity is equal to the quantity of authentication interaction objects displayed in the authentication interface, but also all selected interaction objects are authentication interaction objects displayed in the authentication interface, the authentication succeeds, and the user is allowed to perform a further operation, for example, to use the terminal or use an application program.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; further, an obfuscating interaction object is a real interaction object designated by the user in the terminal, and during the user authentication, the obfuscating interaction object can improve the anti-attack capability of the terminal because an owner of the terminal can distinguish between the authentication interaction object and the obfuscating interaction object; and further, the authentication interaction object, the interference interaction object, and the obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

Figure 5:
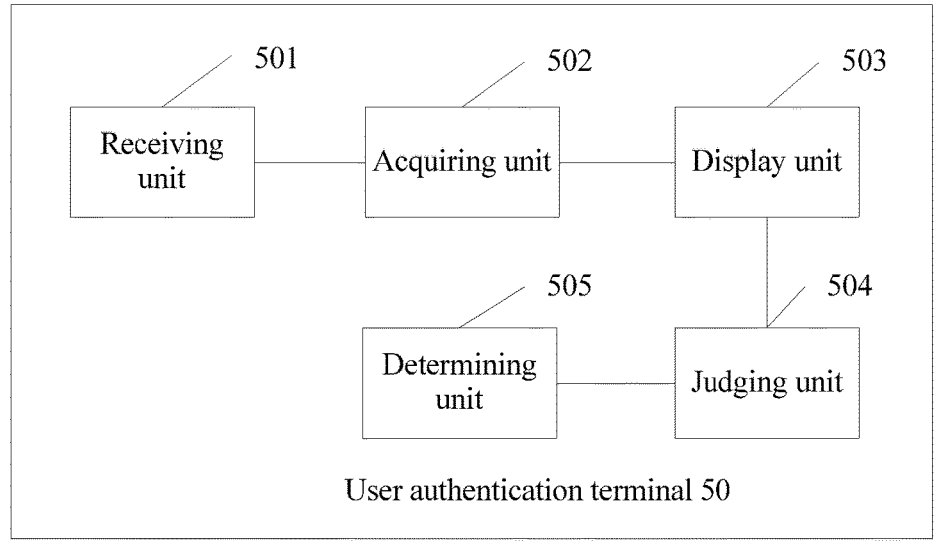
FIG. 5 is a structural diagram of a user authentication terminal according to an embodiment of the present invention.

The following describes a user authentication terminal 50 in an embodiment of the present invention according to FIG. 5. As shown in FIG. 5, the terminal 50 includes:

a receiving unit 501, an acquiring unit 502, a display unit 503, a judging unit 504, and a determining unit 505.

The receiving unit 501 is configured to receive an authentication request.

When the terminal is in a locked state, all input signals except some special signals received by the receiving unit 501 may be used as authentication requests for processing. An input signal may be a signal triggered by an operation of a user on a keyboard, may be a signal triggered by an operation on a sensing screen, or the like. A special signal may be a special call signal such as 110, 119, or 120. When receiving a special call signal, the terminal may dial the special call signal without authenticating the user, and after a call is over, authentication needs to be performed if the user needs to perform an operation on the terminal.

The acquiring unit 502 is configured to acquire an authentication interaction object and an interference interaction object when the receiving unit 501 receives the authentication request, where the authentication interaction object is a real interaction object stored in the terminal, the interference interaction object is a virtual interaction object constructed by the terminal, and the interference interaction object has a similar feature with the authentication interaction object, so as to cause interference to the user when the user is selecting the authentication interaction object.

The authentication interaction object is a real interaction object stored in the terminal. Many resources in the terminal may be interaction objects, for example, a name of a contact, a name of an application program, a name of music, a name of a book, and a picture. The authentication interaction object may be an interaction object that is stored in the terminal and that is preset by the user. If the user sets a sensitive interaction object, the authentication interaction object may be any one or more interaction objects that are stored in the terminal except the sensitive interaction object, where the sensitive interaction object refers to personal privacy of the user; or if the user does not set a sensitive interaction object, the authentication interaction object may be any one or more interaction objects that are stored in the terminal. The authentication interaction object is a real interaction object stored in the terminal. When the user configures the user authentication, if the user considers that no appropriate interaction object in the terminal can be used as the authentication interaction object, the user may enter an interaction object and use the interaction object as the authentication interaction object. The authentication interaction object is a real interaction object stored in the terminal. During user authentication, a memory burden on the user can be reduced because the user is familiar with an interaction object stored in the terminal of the user; because the authentication interaction object is selected from a wide range, various types of interaction objects can be provided during the user authentication, bringing more fun to an authentication process and improving user experience.

The interference interaction object is a virtual interaction object constructed by the terminal, and has a similar feature with the authentication interaction object, so as to cause interference to the user when the user is selecting the authentication interaction object. The interference interaction object may be acquired from a stored interference interaction object set according to the acquired authentication interaction object, where an interference interaction object in the interference interaction object set is pre-constructed by the terminal; or the interference interaction object may be directly constructed by the terminal according to the acquired authentication interaction object, where the interference interaction object is not a real interaction object stored in the terminal.

A similar feature refers to a similar appearance feature or a similar structural feature, so that a viewer cannot easily distinguish between the authentication interaction object and the interference interaction object from a distance, and needs to perform careful observation to make correct distinction. For example, if the authentication interaction object that is set by the user is a name of a contact kerry, a name such as kelly may appear when the terminal constructs the interference interaction object according to an appearance feature of the authentication interaction object. For example, if the authentication interaction object that is set by the user is a picture, the terminal analyzes color proportions and color distributions in the picture, constructs multiple pictures having similar color proportions and color distributions, and uses the multiple pictures as interference interaction objects. Because the interference interaction object has a similar feature with the authentication interaction object, the interference interaction object is relatively confusing, so that an anti-attack capability and an anti-peeping capability of the terminal can be improved.

The authentication interaction object and the interference interaction object are acquired after the authentication request is received. The authentication interaction object obtained this time is compared with an authentication interaction object acquired in a previous time or authentication interaction objects acquired in previous several times, and if the authentication interaction object acquired this time is completely the same as the authentication interaction object acquired in the previous time or the authentication interaction objects acquired in the previous several times, acquiring is performed again. The acquired interference interaction object may also be compared with an interference interaction object acquired in a previous time or interference interaction objects acquired in previous several times, and if the acquired interference interaction object is completely the same as the interference interaction object acquired in the previous time or the interference interaction objects acquired in the previous several times, acquiring is performed again.

Authentication interaction objects may be of a same type, and a type of the interference interaction object may be consistent with a type of the authentication interaction object. In an embodiment of the present invention, if the type of the authentication interaction object is a name of a contact, the interference interaction object set also stores a name of a contact.

Alternatively, the authentication interaction objects may be of different types. For example, there is not only an interaction object of a type of a name of a contact, but also an interaction object of another type such as a picture, a name of music, or a name of an ebook. In another embodiment of the present invention, if the types of the authentication interaction objects include a name of a contact and a picture, interference interaction objects also include a name of a contact and a picture.

The display unit 503 is configured to display the authentication interaction object and the interference interaction object in an authentication interface for the user to select from, where the authentication interaction object and the interference interaction object are acquired by the acquiring unit 502.

The acquired authentication interaction object and the acquired interference interaction object are displayed in the authentication interface. The authentication interaction object and the interference interaction object may be displayed in the authentication interface in a sequence as they are acquired, or the acquired authentication interaction object and the acquired interference interaction object may be randomly displayed in the authentication interface, instead of being displayed in a sequence as they are acquired. There are multiple display sequences, which are not listed one by one.

The receiving unit 501 is further configured to receive a selection result.

The judging unit 504 is configured to determine, according to the selection result received by the receiving unit 501, whether the selection result is the authentication interaction object.

The judging unit 504 performs determining on the selection result received by the receiving unit 501, and not only determines whether a quantity of selected interaction objects is equal to a quantity of authentication interaction objects displayed in the authentication interface, but also determines whether all selected interaction objects are authentication interaction objects displayed in the authentication interface.

The determining unit 505 determines, when the judging unit 504 determines that the selection result is the authentication interaction object, that authentication succeeds.

For the selection result, if not only the quantity is equal to the quantity of authentication interaction objects displayed in the authentication interface, but also all the selected interaction objects are the authentication interaction objects displayed in the authentication interface, the authentication succeeds, and the user is allowed to perform a further operation, for example, to use the terminal or use an application program.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; and further, the authentication interaction object, the interference interaction object, and an obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

Figure 6:
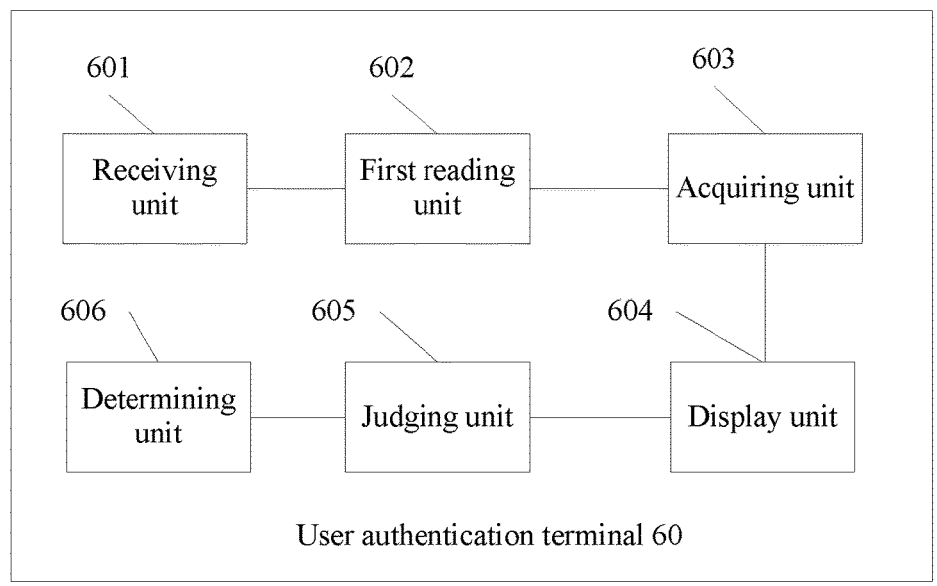
FIG. 6 is a structural diagram of a user authentication terminal according to another embodiment of the present invention.

The following describes a user authentication terminal 60 in an embodiment of the present invention according to FIG. 6. As shown in FIG. 6, the terminal 60 includes:

a receiving unit 601, a first reading unit 602, an acquiring unit 603, a display unit 604, a judging unit 605, and a determining unit 606.

The receiving unit 601 is configured to receive an authentication request.

When the terminal is in a locked state, all input signals except some special signals received by the receiving unit 601 may be used as authentication requests for processing. An input signal may be a signal triggered by an operation of a user on a keyboard, may be a signal triggered by an operation on a sensing screen, or the like. A special signal may be a special call signal such as 110, 119, or 120. When receiving a special call signal, the terminal may dial the special call signal without authenticating the user, and after a call is over, authentication needs to be performed if the user needs to perform an operation on the terminal.

The first reading unit 602 reads an authentication difficulty degree after the receiving unit 601 receives the authentication request, where the authentication difficulty degree includes a first quantity of authentication interaction objects that need to be selected, a second quantity of interference interaction objects that need to be selected, and a third quantity of obfuscating interaction objects that need to be selected, where the authentication interaction object is a real interaction object stored in the terminal; the interference interaction object is a virtual interaction object constructed by the terminal, and has a similar feature with the authentication interaction object, so as to cause interference to the user when the user is selecting the authentication interaction object; and the obfuscating interaction object is a real interaction object designated by the user, and has no intersection with the authentication interaction object.

The first reading unit 602 reads the authentication difficulty degree after the receiving unit 601 receives the authentication request, where the authentication difficulty degree includes the first quantity of authentication interaction objects that need to be selected, and the authentication interaction object is a real interaction object stored in the terminal. Many resources in the terminal may be interaction objects, for example, a name of a contact, a name of an application program, a name of music, a name of a book, and a picture. The authentication interaction object may be an interaction object that is stored in the terminal and that is preset by the user. If the user sets a sensitive interaction object, the authentication interaction object may be any one or more interaction objects that are stored in the terminal except the sensitive interaction object, where the sensitive interaction object refers to personal privacy of the user; or if the user does not set a sensitive interaction object, the authentication interaction object may be any one or more interaction objects that are stored in the terminal.

When the user configures the user authentication, if the user considers that no appropriate interaction object in the terminal can be used as the authentication interaction object, the user may enter an interaction object and use the interaction object as the authentication interaction object. The authentication interaction object is a real interaction object stored in the terminal. During user authentication, a memory burden on the user can be reduced because the user is familiar with an interaction object stored in the terminal of the user; because the authentication interaction object is selected from a wide range, various types of interaction objects can be provided during the user authentication, bringing more fun to an authentication process and improving user experience.

The first reading unit 602 reads the authentication difficulty degree after the receiving unit 601 receives the authentication request, where the authentication difficulty degree includes the second quantity of interference interaction objects that need to be selected, and the interference interaction object is a virtual interaction object constructed by the terminal, and has a similar feature with the authentication interaction object, so as to cause interference to the user when the user is selecting the authentication interaction object. The interference interaction object may be acquired from a stored interference interaction object set according to the acquired authentication interaction object, where an interference interaction object in the interference interaction object set is pre-constructed by the terminal; or the interference interaction object may be directly constructed by the terminal according to the acquired authentication interaction object, where the interference interaction object is not a real interaction object stored in the terminal.

A similar feature refers to a similar appearance feature or a similar structural feature, so that a viewer cannot easily distinguish between the authentication interaction object and the interference interaction object from a distance, and needs to perform careful observation to make correct distinction. For example, if the authentication interaction object that is set by the user is a name of a contact kerry, a name such as kelly may appear when the terminal constructs the interference interaction object according to an appearance feature of the authentication interaction object. For example, if the authentication interaction object that is set by the user is a picture, the terminal analyzes color proportions and color distributions in the picture, constructs multiple pictures having similar color proportions and color distributions, and uses the multiple pictures as interference interaction objects. Because the interference interaction object has a similar feature with the authentication interaction object, the interference interaction object is relatively confusing, so that an anti-attack capability and an anti-peeping capability of the terminal can be improved.

The first reading unit 602 reads the authentication difficulty degree after the receiving unit 601 receives the authentication request, where the authentication difficulty degree includes the third quantity of obfuscating interaction objects that need to be selected, where the obfuscating interaction object is a real interaction object designated by the user, and has no intersection with the authentication interaction object. The obfuscating interaction object is a real interaction object that is stored in the terminal and that is designated by the user. If the user sets a sensitive interaction object, the obfuscating interaction object is selected from a maximum range of real interaction objects that are stored in the terminal except the authentication interaction object and the sensitive interaction object, where the sensitive interaction object refers to personal privacy of the user; or if the user does not set a sensitive interaction object, the obfuscating interaction object is selected from a range of all real interaction objects that are stored in the terminal except the authentication interaction object. Having no intersection means that an interaction object stored in the terminal belongs to only one set and a case in which an interaction object stored in the terminal belongs to two sets at the same time does not exist, where the set may be an authentication interaction object set, a sensitive interaction object set, or an obfuscating interaction object set. Because the obfuscating interaction object is also a real interaction object stored in the terminal, during the user authentication, the obfuscating interaction object is relatively confusing, so that the anti-attack capability of the terminal can be improved.

Authentication interaction objects may be of a same type, and a type of the interference interaction object and a type of the obfuscating interaction object may be consistent with a type of the authentication interaction object. In an embodiment of the present invention, if the type of the authentication interaction object is a name of a contact, the interference interaction object set also stores a name of a contact, and the obfuscating interaction object set also stores a name of a contact.

Alternatively, the authentication interaction objects may be of different types. For example, there is not only an interaction object of a type of a name of a contact, but also an interaction object of another type such as a picture, a name of music, or a name of an ebook. In another embodiment of the present invention, if the types of the authentication interaction objects include a name of a contact and a picture, the interference interaction object set and the obfuscating interaction object set also include a name of a contact and a picture.

The acquiring unit 603 is configured to acquire authentication interaction objects of the first quantity, interference interaction objects of the second quantity, and obfuscating interaction objects of the third quantity according to the authentication difficulty degree that is read by the first reading unit 602.

In an embodiment of the present invention, the interference interaction object may be acquired by the acquiring unit 603 from the interference interaction object set, or may be directly constructed by the acquiring unit 603, where the interference interaction object has a similar feature with the authentication interaction object, so that the anti-peeping capability and the anti-attack capability can be improved during the user authentication.

In an embodiment of the present invention, the authentication interaction object may be directly acquired by the acquiring unit 603 from the authentication interaction object set that is set by the user. During the user authentication, because the authentication interaction object is designated by the user, the memory burden on the user can be reduced if the user selects an authentication interaction object that is set by the user.

In an embodiment of the present invention, the obfuscating interaction object may be acquired by the acquiring unit 603 from a real interaction object set that is designated by the user. The obfuscating interaction object is a real interaction object stored in the terminal, and the obfuscating interaction object has no intersection with the authentication interaction object. If the user sets a sensitive interaction object, the obfuscating interaction object is selected from a maximum range of real interaction objects that are stored in the terminal except the authentication interaction object and the sensitive interaction object, where the sensitive interaction object refers to personal privacy of the user; or if the user does not set a sensitive interaction object, the obfuscating interaction object is selected from a range of all real interaction objects that are stored in the terminal except the authentication interaction object. Having no intersection means that an interaction object stored in the terminal belongs to only one set and a case in which an interaction object stored in the terminal belongs to two sets at the same time does not exist, where the set may be an authentication interaction object set, a sensitive interaction object set, or an obfuscating interaction object set. Because the obfuscating interaction object is also a real interaction object stored in the terminal, during the user authentication, the obfuscating interaction object is relatively confusing, so that the anti-attack capability of the terminal can be improved.

In another embodiment of the present invention, the acquiring unit 603 acquires the authentication interaction object, the interference interaction object, and the obfuscating interaction object according to the authentication difficulty degree. If the authentication difficulty degree is a high-level difficulty degree, the acquiring unit 603 acquires three interaction objects from each of the authentication interaction object set, the interference interaction object set, and the obfuscating interaction object set; if a quantity of interaction objects in one set is less than three, the authentication difficulty degree automatically drops from the high-level difficulty degree to a medium-level difficulty degree, and two interaction objects are acquired from each set according to the medium-level difficulty degree; if a quantity of interaction objects in one set is less than two, the authentication difficulty degree automatically drops from the medium-level difficulty degree to a low-level difficulty degree, and an interaction object is acquired from each set according to the low-level difficulty degree. According to a requirement of the user, the user sets a suitable authentication difficulty degree for the user, which helps improve user experience.

The display unit 604 is configured to display the authentication interaction objects of the first quantity, the interference interaction objects of the second quantity, and the obfuscating interaction objects of the third quantity in an authentication interface for the user to select from, where the authentication interaction objects, the interference interaction objects, and the obfuscating interaction objects are acquired by the acquiring unit 603.

The display unit 604 displays the authentication interaction objects of the first quantity, the interference interaction objects of the second quantity, and the obfuscating interaction objects of the third quantity in the authentication interface for the user to select from, where the authentication interaction objects, the interference interaction objects, and the obfuscating interaction objects are acquired by the acquiring unit 603. The authentication interaction object, the interference interaction object, and the obfuscating interaction object may be displayed in the authentication interface in a sequence as they are acquired, or the acquired authentication interaction object, the acquired interference interaction object, and the acquired obfuscating interaction object may be randomly displayed in the authentication interface, instead of being displayed in a sequence as they are acquired. There are multiple display sequences, which are not listed one by one.

The receiving unit 601 is further configured to receive a selection result.

The judging unit 605 is configured to determine, according to the selection result received by the receiving unit 601, whether the selection result is the authentication interaction object.

The judging unit 605 performs determining on the selection result received by the receiving unit 601, and not only determines whether a quantity of selected interaction objects is equal to a quantity of authentication interaction objects displayed in the authentication interface, but also determines whether all selected interaction objects are authentication interaction objects displayed in the authentication interface.

The determining unit 606 determines, when the judging unit 605 determines that the selection result is the authentication interaction object, that authentication succeeds.

For the selection result, if not only the quantity is equal to the quantity of authentication interaction objects displayed in the authentication interface, but also all the selected interaction objects are the authentication interaction objects displayed in the authentication interface, the authentication succeeds, and the user is allowed to perform a further operation, for example, to use the terminal or use an application program.

It may be learned from the foregoing description that, in the user authentication terminal provided in an embodiment of the present invention, an authentication interaction object is a real interaction object stored in the terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; further, an obfuscating interaction object is a real interaction object designated by the user in the terminal, and during the user authentication, the obfuscating interaction object can improve the anti-attack capability of the terminal because an owner of the terminal can distinguish between the authentication interaction object and the obfuscating interaction object; further, an authentication difficulty degree includes a first quantity of authentication interaction objects, a second quantity of interference interaction objects, and a third quantity of obfuscating interaction objects, and during the user authentication, if the user does not know a quantity of authentication interaction objects that need to be selected, it is very difficult to succeed in the user authentication, and the authentication difficulty degree improves the anti-attack capability of the terminal; further, the authentication interaction object, the interference interaction object, and the obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

Figure 7:
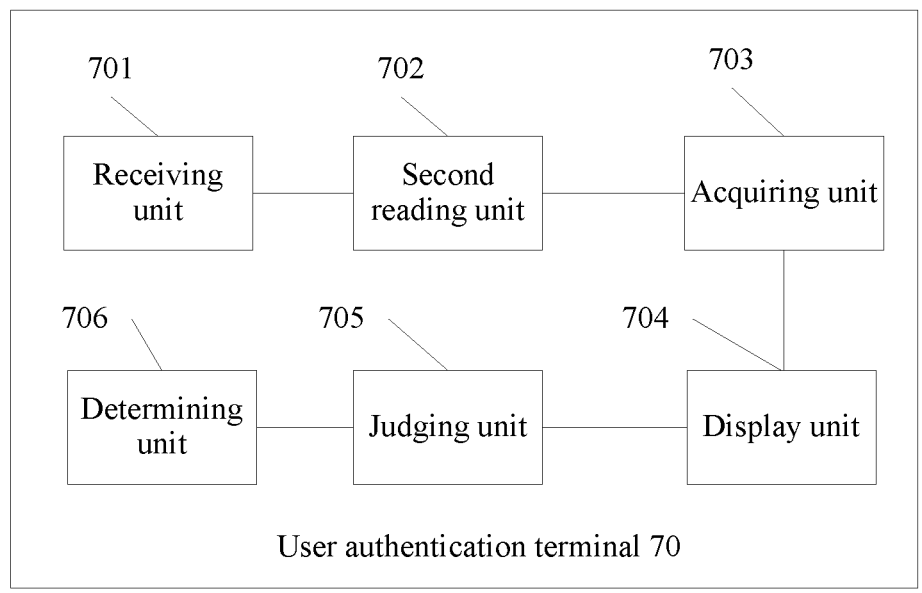
FIG. 7 is a structural diagram of a user authentication terminal according to another embodiment of the present invention.

The following describes a user authentication terminal 70 in an embodiment of the present invention according to FIG. 7. As shown in FIG. 7, the terminal 70 includes:

a receiving unit 701, a second reading unit 702, an acquiring unit 703, a display unit 704, a judging unit 705, and a determining unit 706.

The receiving unit 701 is configured to receive an authentication request.

When the terminal is in a locked state, all input signals except some special signals received by the receiving unit 701 may be used as authentication requests for processing. An input signal may be a signal triggered by an operation of a user on a keyboard, may be a signal triggered by an operation on a sensing screen, or the like. A special signal may be a special call signal such as 110, 119, or 120. When receiving a special call signal, the terminal may dial the special call signal without authenticating the user, and after a call is over, authentication needs to be performed if the user needs to perform an operation on the terminal.

The second reading unit 702 acquires an authentication difficulty degree after the receiving unit 701 receives the authentication request, where the authentication difficulty degree includes a first quantity of authentication interaction objects that need to be selected and a second quantity of interference interaction objects that need to be selected, the authentication interaction object is a real interaction object stored in the terminal, and the interference interaction object is a virtual interaction object constructed by the terminal, and has a similar feature with the authentication interaction object.

The second reading unit 702 acquires the authentication difficulty degree after the receiving unit 701 receives the authentication request, where the authentication difficulty degree includes the first quantity of authentication interaction objects that need to be selected. The authentication interaction object is a real interaction object stored in the terminal. During configuration of a parameter used for user authentication, if the user does not set a sensitive interaction object, the authentication interaction object may be any one or more real interaction objects stored in the terminal, where the sensitive interaction object refers to personal privacy of the user; or if the user sets a sensitive interaction object, the authentication interaction object may be any one or more real interaction objects that are stored in the terminal except the sensitive interaction object.

When the user configures the user authentication, if the user considers that no appropriate interaction object in the terminal can be used as the authentication interaction object, the user may enter an interaction object and use the interaction object as the authentication interaction object. The authentication interaction object is a real interaction object stored in the terminal. During the user authentication, a memory burden on the user can be reduced because the user is familiar with an interaction object stored in the terminal of the user; because the authentication interaction object is selected from a wide range, various types of interaction objects can be provided during the user authentication, bringing more fun to an authentication process and improving user experience.

The second reading unit 702 acquires the authentication difficulty degree after the receiving unit 701 receives the authentication request, where the authentication difficulty degree includes the second quantity of interference interaction objects that need to be selected. The interference interaction object is a virtual interaction object constructed by the terminal, and has a similar feature with the authentication interaction object, so as to cause interference to the user when the user is selecting the authentication interaction object. The interference interaction object may be acquired from a stored interference interaction object set according to the acquired authentication interaction object, where an interference interaction object in the interference interaction object set is pre-constructed by the terminal; or the interference interaction object may be directly constructed by the terminal according to the acquired authentication interaction object, where the interference interaction object is not a real interaction object stored in the terminal.

A similar feature refers to a similar appearance feature or a similar structural feature, so that a viewer cannot easily distinguish between the authentication interaction object and the interference interaction object from a distance, and needs to perform careful observation to make correct distinction. For example, if the authentication interaction object that is set by the user is a name of a contact kerry, a name such as kelly may appear when the terminal constructs the interference interaction object according to an appearance feature of the authentication interaction object. For example, if the authentication interaction object that is set by the user is a picture, the terminal analyzes color proportions and color distributions in the picture, constructs multiple pictures having similar color proportions and color distributions, and uses the multiple pictures as interference interaction objects. Because the interference interaction object has a similar feature with the authentication interaction object, the interference interaction object is relatively confusing, so that an anti-attack capability and an anti-peeping capability of the terminal can be improved.

Authentication interaction objects may be of a same type, and a type of the interference interaction object and a type of the obfuscating interaction object may be consistent with a type of the authentication interaction object. In an embodiment of the present invention, if the type of the authentication interaction object is a name of a contact, the interference interaction object set also stores a name of a contact, and an obfuscating interaction object set also stores a name of a contact.

Alternatively, the authentication interaction objects may be of different types. For example, there is not only an interaction object of a type of a name of a contact, but also an interaction object of another type such as a picture, a name of music, or a name of an ebook. In another embodiment of the present invention, if the types of the authentication interaction objects include a name of a contact and a picture, the interference interaction object set and the obfuscating interaction object set also include a name of a contact and a picture.

The acquiring unit 703 is configured to acquire authentication interaction objects of the first quantity and interference interaction objects of the second quantity according to the authentication difficulty degree that is read by the second reading unit 702.

In an embodiment of the present invention, the interference interaction object may be directly acquired by the acquiring unit 703 from the interference interaction object set, or may be directly constructed by the acquiring unit 703, where the interference interaction object has a similar feature with the authentication interaction object and can improve the anti-peeping capability.

In an embodiment of the present invention, the acquiring unit 703 acquires the authentication interaction object, and during the configuration of the parameter used for the user authentication, if a sensitive interaction object is set, the authentication interaction object may be any one or more real interaction objects that are stored in the terminal except the sensitive interaction object; or if no sensitive interaction object is set, the authentication interaction object may be any one or more real interaction objects that are stored in the terminal.

In an embodiment of the present invention, the acquiring unit 703 acquires the authentication interaction objects of the first quantity and the interference interaction objects of the second quantity according to the authentication difficulty degree that is read by the second reading unit 702. The authentication interaction object obtained this time is compared with an authentication interaction object acquired in a previous time or authentication interaction objects acquired in previous several times, and if the authentication interaction object acquired this time is completely the same as the authentication interaction object acquired in the previous time or the authentication interaction objects acquired in the previous several times, acquiring is performed again. The acquired interference interaction object may also be compared with an interference interaction object acquired in a previous time or interference interaction objects acquired in previous several times, and if the acquired interference interaction object is completely the same as the interference interaction object acquired in the previous time or the interference interaction objects acquired in the previous several times, acquiring is performed again.

In another embodiment of the present invention, the acquiring unit 703 acquires the authentication interaction object and the interference interaction object according to the authentication difficulty degree. If the authentication difficulty degree is a high-level authentication difficulty degree, the terminal may acquire three interaction objects from each of an authentication interaction object set and the interference interaction object set; if a quantity of interaction objects in one set is less than three, the authentication difficulty degree automatically drops from the high-level authentication difficulty degree to a medium-level difficulty degree, and two interaction objects are acquired from each set according to the medium-level difficulty degree; if a quantity of interaction objects in one set is less than two, the authentication difficulty degree automatically drops from the medium-level difficulty degree to a low-level difficulty degree, and an interaction object is acquired from each set according to the low-level difficulty degree. According to a requirement of the user, the user sets a suitable authentication difficulty degree for the user, which helps improve user experience.

The display unit 704 is configured to display the authentication interaction objects of the first quantity and the interference interaction objects of the second quantity in an authentication interface for the user to select from, where the authentication interaction objects and the interference interaction objects are acquired by the acquiring unit 703.

The display unit 704 displays the authentication interaction object and the interference interaction object in the authentication interface for the user to select from, where the authentication interaction objects and the interference interaction objects are acquired by the acquiring unit 703. The authentication interaction object and the interference interaction object may be displayed in the authentication interface in a sequence as they are acquired, or the acquired authentication interaction object and the acquired interference interaction object may be randomly displayed in the authentication interface, instead of being displayed in a sequence as they are acquired. There are multiple display sequences, which are not listed one by one.

The receiving unit 701 is further configured to receive a selection result.

The judging unit 705 is configured to determine, according to the selection result of the user that is received by the receiving unit 701, whether the selection result is the authentication interaction object.

The judging unit 705 performs determining on the selection result received by the receiving unit 701, and not only determines whether a quantity of selected interaction objects is equal to a quantity of authentication interaction objects displayed in the authentication interface, but also determines whether all selected interaction objects are authentication interaction objects displayed in the authentication interface.

The determining unit 706 determines, when the judging unit 705 determines that the selection result is the authentication interaction object, that authentication succeeds.

For the selection result, if not only the quantity is equal to a quantity of authentication interaction objects displayed in the authentication interface, but also all the selected authentication interaction objects are the authentication interaction objects displayed in the authentication interface, the authentication succeeds, and the user is allowed to use the terminal.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; further, an authentication difficulty degree includes a first quantity of authentication interaction objects and a second quantity of interference interaction objects, and during the user authentication, if the user does not know a quantity of authentication interaction objects that need to be selected, it is very difficult to succeed in the user authentication, and the authentication difficulty degree improves the anti-attack capability of the terminal; and further, the authentication interaction object and the interference interaction object may be interaction objects such as a name of a contact, a name of an application program, a name of a book, a name of music, and a picture, and extensive interaction object types cover a large quantity of interaction objects; therefore, during a user authentication process, different authentication interaction objects and interference interaction objects may be displayed in an authentication interface at a time, thereby not only improving the anti-attack capability of the terminal, but also bringing more fun to the authentication process.

Figure 8:
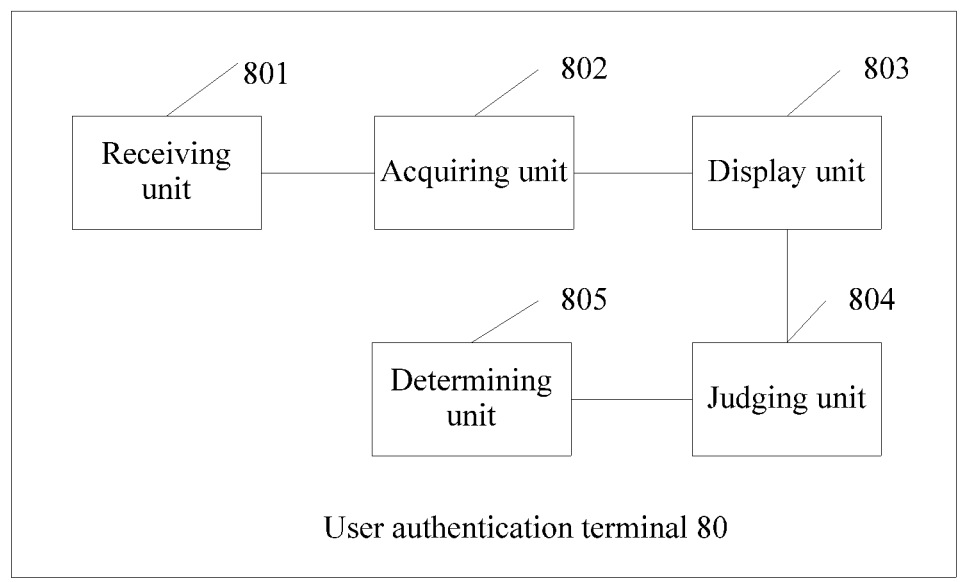
FIG. 8 is a structural diagram of a user authentication terminal according to another embodiment of the present invention.

The following describes a user authentication terminal 80 in an embodiment of the present invention according to FIG. 8. As shown in FIG. 8, the terminal 80 includes:

a receiving unit 801, an acquiring unit 802, a display unit 803, a judging unit 804, and a determining unit 805.

The receiving unit 801 is configured to receive an authentication request.

When the terminal is in a locked state, all input signals except some special signals received by the receiving unit 801 may be used as authentication requests for processing. An input signal may be a signal triggered by an operation of a user on a keyboard, may be a signal triggered by an operation on a sensing screen, or the like. A special signal may be a special call signal such as 110, 119, or 120. When receiving a special call signal, the terminal may dial the special call signal without authenticating the user, and after a call is over, authentication needs to be performed if the user needs to perform an operation on the terminal.

The acquiring unit 802 is configured to acquire an authentication interaction object and an interference interaction object when the receiving unit 801 receives the authentication request, where the authentication interaction object is a real interaction object stored in the terminal, the interference interaction object is a virtual interaction object constructed by the terminal, and the interference interaction object has a similar feature with the authentication interaction object, so as to cause interference to the user when the user is selecting the authentication interaction object.

The authentication interaction object is a real interaction object stored in the terminal. Many resources in the terminal may be interaction objects, for example, a name of a contact, a name of an application program, a name of music, a name of a book, and a picture. The authentication interaction object may be an interaction object that is stored in the terminal and that is preset by the user. If the user sets a sensitive interaction object, the authentication interaction object may be any one or more interaction objects that are stored in the terminal except the sensitive interaction object, where the sensitive interaction object refers to personal privacy of the user; or if the user does not set a sensitive interaction object, the authentication interaction object may be any one or more interaction objects that are stored in the terminal. The authentication interaction object is a real interaction object stored in the terminal. When the user configures the user authentication, if the user considers that no appropriate interaction object in the terminal can be used as the authentication interaction object, the user may enter an interaction object and use the interaction object as the authentication interaction object. The authentication interaction object is a real interaction object stored in the terminal. During user authentication, a memory burden on the user can be reduced because the user is familiar with an interaction object stored in the terminal of the user; because the authentication interaction object is selected from a wide range, various types of interaction objects can be provided during the user authentication, bringing more fun to an authentication process and improving user experience.

The interference interaction object is a virtual interaction object constructed by the terminal, and has a similar feature with the authentication interaction object, so as to cause interference to the user when the user is selecting the authentication interaction object. The interference interaction object may be acquired from a stored interference interaction object set according to the acquired authentication interaction object, where an interference interaction object in the interference interaction object set is pre-constructed by the terminal; or the interference interaction object may be directly constructed by the terminal according to the acquired authentication interaction object, where the interference interaction object is not a real interaction object stored in the terminal.

A similar feature refers to a similar appearance feature or a similar structural feature, so that a viewer cannot easily distinguish between the authentication interaction object and the interference interaction object from a distance, and needs to perform careful observation to make correct distinction. For example, if the authentication interaction object that is set by the user is a name of a contact kerry, a name such as kelly may appear when the terminal constructs the interference interaction object according to an appearance feature of the authentication interaction object. For example, if the authentication interaction object that is set by the user is a picture, the terminal analyzes color proportions and color distributions in the picture, constructs multiple pictures having similar color proportions and color distributions, and uses the multiple pictures as interference interaction objects. Because the interference interaction object has a similar feature with the authentication interaction object, the interference interaction object is relatively confusing, so that an anti-attack capability and an anti-peeping capability of the terminal can be improved.

The authentication interaction object and the interference interaction object are acquired after the authentication request is received. The authentication interaction object obtained this time is compared with an authentication interaction object acquired in a previous time or authentication interaction objects acquired in previous several times, and if the authentication interaction object acquired this time is completely the same as the authentication interaction object acquired in the previous time or the authentication interaction objects acquired in the previous several times, acquiring is performed again. The acquired interference interaction object may also be compared with an interference interaction object acquired in a previous time or interference interaction objects acquired in previous several times, and if the acquired interference interaction object is completely the same as the interference interaction object acquired in the previous time or the interference interaction objects acquired in the previous several times, acquiring is performed again.

Authentication interaction objects may be of a same type, and a type of the interference interaction object may be consistent with a type of the authentication interaction object. In an embodiment of the present invention, if the type of the authentication interaction object is a name of a contact, the interference interaction object set also stores a name of a contact.

Alternatively, the authentication interaction objects may be of different types. For example, there is not only an interaction object of a type of a name of a contact, but also an interaction object of another type such as a picture, a name of music, or a name of an ebook. In another embodiment of the present invention, if the types of the authentication interaction objects include a name of a contact and a picture, interference interaction objects also include a name of a contact and a picture.

The acquiring unit 802 is further configured to select an obfuscating interaction object from a stored obfuscating interaction object set, where an obfuscating interaction object in the obfuscating interaction object set is a real interaction object designated by the user, and the obfuscating interaction object has no intersection set with the authentication interaction object.

The obfuscating interaction object is a real interaction object that is stored in the terminal and that is designated by the user. If the user sets a sensitive interaction object, the obfuscating interaction object is selected from a maximum range of real interaction objects that are stored in the terminal except the authentication interaction object and the sensitive interaction object, where the sensitive interaction object refers to personal privacy of the user; or if the user does not set a sensitive interaction object, the obfuscating interaction object is selected from a range of all real interaction objects that are stored in the terminal except the authentication interaction object. Because the obfuscating interaction object is also a real interaction object stored in the terminal, during the user authentication, the obfuscating interaction object is relatively confusing, so that the anti-attack capability of the terminal can be improved.

The display unit 803 is configured to display the authentication interaction object, the interference interaction object, and the obfuscating interaction object in an authentication interface for the user to select from, where the interference interaction object, and the obfuscating interaction object are acquired by the acquiring unit 802.

The acquired authentication interaction object and the acquired interference interaction object are displayed in the authentication interface. The authentication interaction object, the interference interaction object, and the obfuscating interaction object may be displayed in the authentication interface in a sequence as they are acquired, or the acquired authentication interaction object, the acquired interference interaction object, and the acquired obfuscating interaction object may be randomly displayed in the authentication interface, instead of being displayed in a sequence as they are acquired. There are multiple display sequences, which are not listed one by one.

The receiving unit 801 is further configured to receive a selection result.

The judging unit 804 is configured to determine, according to the selection result received by the receiving unit 801, whether the selection result is the authentication interaction object.

The judging unit 804 performs determining on the selection result received by the receiving unit 801, and not only determines whether a quantity of selected interaction objects is equal to a quantity of authentication interaction objects displayed in the authentication interface, but also determines whether all selected interaction objects are authentication interaction objects displayed in the authentication interface.

The determining unit 805 determines, when the judging unit 804 determines that the selection result is the authentication interaction object, that authentication succeeds.

For the selection result, if not only the quantity is equal to the quantity of authentication interaction objects displayed in the authentication interface, but also all the selected interaction objects are the authentication interaction objects displayed in the authentication interface, the authentication succeeds, and the user is allowed to perform a further operation, for example, to use the terminal or use an application program.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; further, an obfuscating interaction object is a real interaction object designated by the user in the terminal, and during the user authentication, the obfuscating interaction object can improve the anti-attack capability of the terminal because an owner of the terminal can distinguish between the authentication interaction object and the obfuscating interaction object; further, the authentication interaction object, the interference interaction object, and the obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

Figure 9:
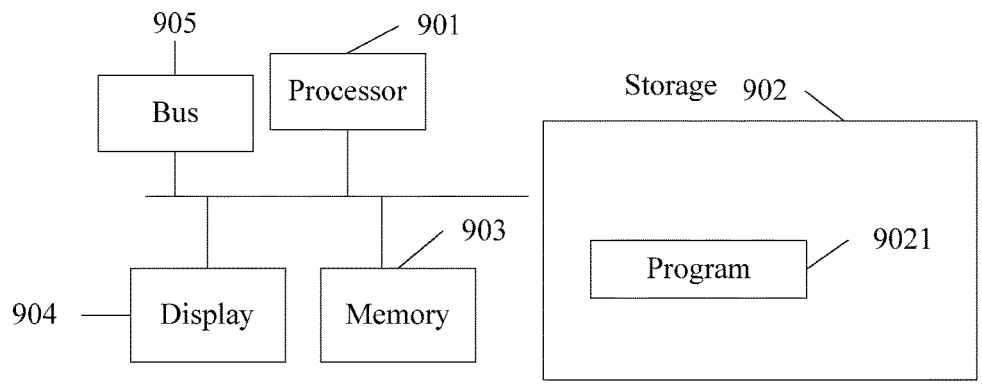
FIG. 9 is a structural diagram of a user authentication terminal according to another embodiment of the present invention.

In FIG. 9, a structure of a running drive device according to another embodiment of the present invention is described, where the device includes at least one processor 901 (for example, a CPU), a storage 902, a memory 903, a display 904, and at least one communications bus 905, so as to implement connection and communication between these apparatuses. The processor 901 is configured to execute an executable module stored in the storage 902, for example, a computer program. The storage 902 may include a high-speed random access memory (RAM) and may further include a non-volatile memory, for example, at least one magnetic disk memory. An address in the memory is accessed by using the at least one processor.

In some implementation manners, the storage 902 stores a program 9021, and the program 9021 may be executed by the processor 901. This program includes: acquiring an authentication interaction object and an interference interaction object after an authentication request is received, where the authentication interaction object is a real interaction object stored in a terminal, and the interference interaction object is a virtual interaction object constructed by the terminal, and has a similar feature with the authentication interaction object, so as to cause interference to a user when the user is selecting the authentication interaction object; displaying the authentication interaction object and the interference interaction object in an authentication interface for the user to select from; receiving a selection result and determining whether the selection result is the authentication interaction object; and determining, when the selection result is the authentication interaction object, that authentication succeeds.

Specific implementation steps are the same as those in the embodiment shown in FIG. 1, and details are not described herein again.

It may be learned from the foregoing description that, in the user authentication terminal provided in an embodiment of the present invention, an authentication interaction object is a real interaction object stored in the terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; and further, the authentication interaction object, the interference interaction object, and an obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

Figure 10:
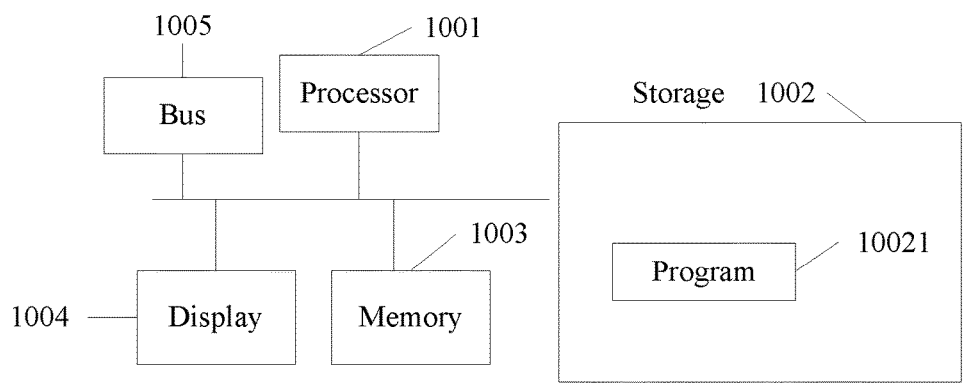
FIG. 10 is a structural diagram of a user authentication terminal according to another embodiment of the present invention.

In FIG. 10, a structure of a running drive device according to another embodiment of the present invention is described, where the device includes at least one processor 1001 (for example, a CPU), a storage 1002, a memory 1003, a display 1004, and at least one communications bus 1005, so as to implement connection and communication between these apparatuses. The processor 1001 is configured to execute an executable module stored in the storage 1002, for example, a computer program. The storage 1002 may include a high-speed random access memory and may further include a non-volatile memory, for example, at least one magnetic disk memory. An address in the memory is accessed by using the at least one processor.

In some implementation manners, the storage 1002 stores a program 10021, and the program 10021 may be executed by the processor 1001. This program includes: reading an authentication difficulty degree after an authentication request is received, where the authentication difficulty degree includes a first quantity of authentication interaction objects that need to be selected, a second quantity of interference interaction objects that need to be selected, and a third quantity of obfuscating interaction objects that need to be selected, where the authentication interaction object is a real interaction object stored in a terminal, the interference interaction object is a virtual interaction object constructed by the terminal, and has a similar feature with the authentication interaction object, so as to cause interference to a user when the user is selecting the authentication interaction object, and the obfuscating interaction object is a real interaction object designated by the user, and has no intersection with the authentication interaction object; acquiring authentication interaction objects of the first quantity, interference interaction objects of the second quantity, and obfuscating interaction object of the third quantity according to the authentication difficulty degree; displaying the authentication interaction objects of the first quantity, the interference interaction objects of the second quantity, and the obfuscating interaction objects of the third quantity in an authentication interface for selection; receiving a selection result and determining whether the selection result is the authentication interaction object; and when the selection result is completely the authentication interaction object, determining that authentication succeeds. Specific implementation steps are the same as those in the embodiment shown in FIG. 2, and details are not described herein again.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; further, an obfuscating interaction object is a real interaction object designated by the user in the terminal, and during the user authentication, the obfuscating interaction object can improve the anti-attack capability of the terminal because an owner of the terminal can distinguish between the authentication interaction object and the obfuscating interaction object; further, an authentication difficulty degree includes a first quantity of authentication interaction objects, a second quantity of interference interaction objects, and a third quantity of obfuscating interaction objects, and during the user authentication, if the user does not know a quantity of authentication interaction objects that need to be selected, it is very difficult to succeed in the user authentication, and the authentication difficulty degree improves the anti-attack capability of the terminal; and further, the authentication interaction object, the interference interaction object, and the obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

Figure 11:
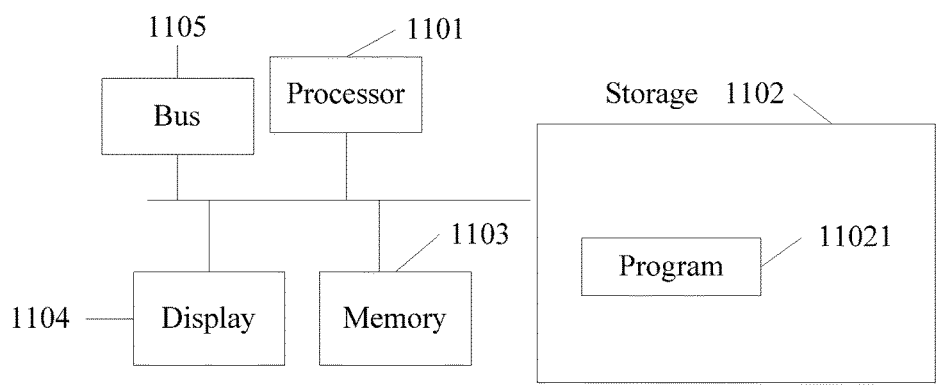
FIG. 11 is a structural diagram of a user authentication terminal according to another embodiment of the present invention.

In FIG. 11, a structure of a running drive device according to another embodiment of the present invention is described, where the device includes at least one processor 1101 (for example, a CPU), a storage 1102, a memory 1103, a display 1104, and at least one communications bus 1105, so as to implement connection and communication between these apparatuses. The processor 1101 is configured to execute an executable module stored in the storage 1102, for example, a computer program. The storage 1102 may include a high-speed random access memory and may further include a non-volatile memory, for example, at least one magnetic disk memory. An address in the memory is accessed by using the at least one processor.

In some implementation manners, the storage 1102 stores a program 11021, and the program 11021 may be executed by the processor 1101. This program includes: reading an authentication difficulty degree after an authentication request is received, where the authentication difficulty degree includes a first quantity of authentication interaction objects that need to be selected and a second quantity of interference interaction objects that need to be selected, the authentication interaction object is a real interaction object stored in a terminal, and the interference interaction object is a virtual interaction object constructed by the terminal, and has a similar feature with the authentication interaction object, so as to cause interference to a user when the user is selecting the authentication interaction object; acquiring authentication interaction objects of the first quantity and interference interaction objects of the second quantity according to the authentication difficulty degree; displaying the authentication interaction objects of the first quantity and the interference interaction objects of the second quantity in an authentication interface for selection; receiving a selection result and determining whether the selection result is the authentication interaction object; and when the selection result is completely the authentication interaction object, determining that authentication succeeds. Specific implementation steps are the same as those in the embodiment shown in FIG. 3, and details are not described herein again.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; an authentication difficulty degree includes a first quantity of authentication interaction objects and a second quantity of interference interaction objects, and during the user authentication, if the user does not know a quantity of authentication interaction objects that need to be selected, it is very difficult to succeed in the user authentication, and the authentication difficulty degree improves the anti-attack capability of the terminal; and further, the authentication interaction object and the interference interaction object may be interaction objects such as a name of a contact, a name of an application program, a name of a book, a name of music, and a picture, and extensive interaction object types cover a large quantity of interaction objects; therefore, during a user authentication process, different authentication interaction objects and interference interaction objects may be displayed in an authentication interface at a time, thereby not only improving the anti-attack capability of the terminal, but also bringing more fun to the authentication process.

Figure 12:
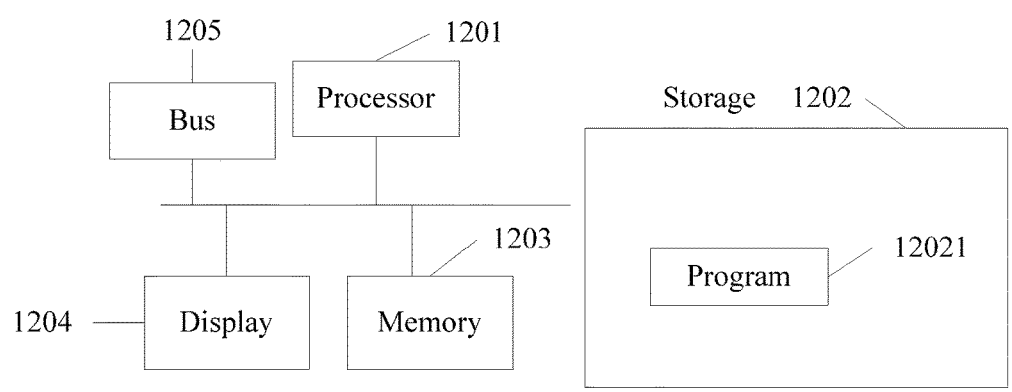
FIG. 12 is a structural diagram of a user authentication terminal according to another embodiment of the present invention.

In FIG. 12, a structure of a running drive device according to another embodiment of the present invention is described, where the device includes at least one processor 1201 (for example, a CPU), a storage 1202, a memory 1203, a display 1204, and at least one communications bus 1205, so as to implement connection and communication between these apparatuses. The processor 1201 is configured to execute an executable module stored in the storage 1202, for example, a computer program. The storage 1202 may include a high-speed RAM and may further include a non-volatile memory, for example, at least one magnetic disk memory. An address in the memory is accessed by using the at least one processor.

In some implementation manners, the storage 1202 stores a program 12021, and the program 12021 may be executed by the processor 1201. This program includes: acquiring an authentication interaction object and an interference interaction object after an authentication request is received, where the authentication interaction object is a real interaction object stored in a terminal, and the interference interaction object is a virtual interaction object constructed by the terminal, and has a similar feature with the authentication interaction object, so as to cause interference to a user when the user is selecting the authentication interaction object; selecting an obfuscating interaction object from a stored obfuscating interaction object set, where an obfuscating interaction object in the obfuscating interaction object set is a real interaction object designated by the user, and the obfuscating interaction object has no intersection with the authentication interaction object; displaying the authentication interaction object, the interference interaction object, and the obfuscating interaction object in an authentication interface for selection; receiving a selection result and determining whether the selection result is the authentication interaction object; and determining, when the selection result is the authentication interaction object, that authentication succeeds.

Specific implementation steps are the same as those in the embodiment shown in FIG. 4, and details are not described herein again.

It may be learned from the foregoing description that, in the user authentication method provided in an embodiment of the present invention, an authentication interaction object is a real interaction object stored in a terminal, and during user authentication, a memory burden on a user can be reduced because the user is familiar with an interaction object stored in the terminal of the user; further, an interference interaction object is a virtual interaction object constructed by the terminal, and has a similar feature with the authentication interaction object, so that an anti-attack capability of the terminal can be improved during the user authentication; an obfuscating interaction object is a real interaction object designated by the user in the terminal, and during the user authentication, the obfuscating interaction object can improve the anti-attack capability of the terminal because an owner of the terminal can distinguish between the authentication interaction object and the obfuscating interaction object; and further, the authentication interaction object, the interference interaction object, and the obfuscating interaction object may be interaction objects such as a name of a contact, a name of an application program, a name of a book, a name of music, and a picture, and extensive interaction object types cover a large quantity of interaction objects; therefore, during a user authentication process, different authentication interaction objects, interference interaction objects, and obfuscating interaction objects may be displayed in an authentication interface at a time, thereby not only improving the anti-attack capability of the terminal, but also bringing more fun to the authentication process.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also understand that all the embodiments described in this specification belong to exemplary embodiments, and the involved actions and modules are not necessarily mandatory to the present invention.

Content such as information exchange and an execution process between the modules in the foregoing apparatus and system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a RAM.

Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A user authentication method, comprising:
reading an authentication difficulty degree, wherein the authentication difficulty degree comprises a first quantity of authentication interaction objects and a second quantity of interference interaction objects;
acquiring the authentication interaction objects of the first quantity and the interference interaction objects of the second quantity according to the authentication difficulty degree after an authentication request is received, wherein the authentication interaction objects are real interaction objects, wherein the interference interaction objects are virtual interaction objects, wherein one of the interference interaction objects has a similar feature with one of the authentication interaction objects, and wherein the similar feature refers to a similar appearance feature or a similar structural feature;
displaying the authentication interaction objects of the first quantity and the interference interaction objects of the second quantity in an authentication interface for a user to select from;
receiving a selection result according to a user selection and determining whether the selection result is the authentication interaction objects of the first quantity; and
determining that authentication succeeds in response to the selection result being the authentication interaction objects of the first quantity.

2. The user authentication method according to claim 1, the method further comprising selecting, before the displaying the authentication interaction objects of the first quantity and the interference interaction objects of the second quantity, an obfuscating interaction object from a stored obfuscating interaction object set, wherein an obfuscating interaction object in the obfuscating interaction object set is a real interaction object designated by the user, and wherein the obfuscating interaction object and the authentication interaction objects have no intersection set; and
wherein the displaying the authentication interaction objects of the first quantity and the interference interaction objects of the second quantity comprises displaying the authentication interaction objects of the first quantity, the interference interaction objects of the second quantity, and the obfuscating interaction object in the authentication interface for the user to select from.

3. The user authentication method according to claim 2, the authentication difficulty degree further comprises a third quantity of obfuscating interaction objects;
wherein the acquiring the authentication interaction objects of the first quantity and the interference interaction objects of the second quantity further comprises acquiring obfuscating interaction objects of the third quantity;
wherein the selecting an obfuscating interaction object from a stored obfuscating interaction object set comprises acquiring the obfuscating interaction objects of the third quantity according to the authentication difficulty degree;
wherein the displaying the authentication interaction objects of the first quantity, the interference interaction objects of the second quantity, and the obfuscating interaction object in the authentication interface for the user to select from comprises: displaying the authentication interaction objects of the first quantity, the interference interaction objects of the second quantity, and the obfuscating interaction objects of the third quantity in the authentication interface.

4. The user authentication method according to claim 1, wherein the acquiring the interference interaction objects of the second quantity comprises:
constructing the interference interaction objects of the second quantity according to the acquired authentication interaction objects.

5. The user authentication method according to claim 1, wherein the acquiring the interference interaction objects of the second quantity comprises:
selecting the interference interaction objects of the second quantity from a stored interference interaction object set according to the acquired authentication interaction objects, wherein the interference interaction objects in the interference interaction object set was pre-constructed by a terminal.

6. The user authentication method according to claim 1, wherein the acquiring the authentication interaction objects comprises:
selecting the authentication interaction objects of the first quantity from a stored authentication interaction object set, wherein the authentication interaction objects in the authentication interaction object set was preset by the user.

7. A user authentication terminal, comprising:
a display unit,
a processor connected to the display unit; and
a non-transitory computer-readable storage medium storing a program to be executed by the processor, the program including instructions to:
receive an authentication request;
read an authentication difficulty degree, wherein the authentication difficulty degree comprises a first quantity of authentication interaction objects and a second quantity of interference interaction objects;
acquire the authentication interaction objects of the first quantity and the interference interaction objects of the second quantity according to the authentication difficulty degree when the authentication request is received, wherein the authentication interaction objects are real interaction objects, the interference interaction objects are virtual interaction objects, one of the interference interaction objects has a similar feature with one of the authentication interaction objects, and wherein, the similar feature is a similar appearance feature or a similar structural feature;
cause the display unit to display the authentication interaction objects of the first quantity and the interference interaction objects of the second quantity in an authentication interface for the user to select from;
receive a selection result;
determine, according to the received selection result, whether the selection result is the acquired authentication interaction objects of the first quantity; and
determine that authentication succeeds when the selection result is determined to be the authentication interaction objects of the first quantity.

8. The user authentication terminal according to claim 7, wherein the instructions to acquire the authentication interaction objects of the first quantity and the interference interaction objects of the second quantity further comprise instructions to select an obfuscating interaction object from a stored obfuscating interaction object set, wherein an obfuscating interaction object in the obfuscating interaction object set is a real interaction object designated by the user, and the obfuscating interaction object and the authentication interaction objects have no intersection set; and
wherein the instructions to cause the display unit to display the authentication interaction objects of the first quantity and the interference interaction objects of the second quantity further comprise instructions to cause the display unit to display the obfuscating interaction object in the authentication interface for the user to select from.

9. The user authentication terminal according to claim 8, the authentication difficulty degree further comprises a third quantity of obfuscating interaction objects;
wherein the instructions to acquire the authentication interaction objects of the first quantity and an interference interaction objects of the second quantity further comprise instructions to acquire the obfuscating interaction objects of the third quantity; and
wherein the instructions to cause the display unit to display the authentication interaction objects of the first quantity and the interference interaction objects of the second quantity comprise instructions to display the authentication interaction objects of the first quantity, the interference interaction objects of the second quantity, and the obfuscating interaction objects of the third quantity in the authentication interface.

10. The user authentication terminal according to claim 7, wherein the instructions to acquire the interference interaction objects of the second quantity comprise instructions to construct the interference interaction objects of the second quantity according to authentication interaction objects.

11. The user authentication terminal according to claim 7, wherein the instructions to acquire the interference interaction objects of the second quantity comprise instructions to select the interference interaction objects of the second quantity from a stored interference interaction object set according to authentication interaction objects, wherein the interference interaction objects in the interference interaction object set was pre-constructed by a terminal.

12. The user authentication terminal according to claim 7, wherein the instructions to acquire the authentication interaction objects comprise instructions to select the authentication interaction objects of the first quantity from a stored authentication interaction object set, wherein the authentication interaction objects in the authentication interaction object set is preset by the user.

13. The user authentication method according to claim 1, wherein the authentication interaction objects are the real interaction objects stored in a terminal.

14. The user authentication method according to claim 1, wherein the interference interaction objects are the virtual interaction objects constructed by a terminal.

15. The user authentication terminal according to claim 7, wherein the authentication interaction objects are the real interaction objects stored in a terminal.

16. The user authentication terminal according to claim 7, wherein the interference interaction objects are the virtual interaction objects constructed by a terminal.

* * * * *